(12) United States Patent
Goren

(10) Patent No.: US 7,446,755 B1
(45) Date of Patent: Nov. 4, 2008

(54) INPUT DEVICE AND METHOD FOR ENTERING DATA EMPLOYING A TOGGLE INPUT CONTROL

(75) Inventor: Michael Goren, Niskayuna, NY (US)

(73) Assignee: Prevalent Devices LLC, Albany, NY (US)

( * ) Notice: Subject to any disclaimer, the term of this patent is extended or adjusted under 35 U.S.C. 154(b) by 404 days.

(21) Appl. No.: 11/316,512

(22) Filed: Dec. 22, 2005

Related U.S. Application Data

(63) Continuation of application No. 10/852,739, filed on May 24, 2004, now Pat. No. 7,321,360.

(51) Int. Cl.
*G09G 5/08* (2006.01)
*G06F 19/00* (2006.01)

(52) U.S. Cl. .................. 345/161; 345/168; 463/37; 463/38

(58) Field of Classification Search ................. 345/156, 345/157, 161, 163, 168, 173, 184; 341/20–23; 434/112–115, 156–161; 715/863, 773; 700/17, 700/83–85
See application file for complete search history.

(56) References Cited

U.S. PATENT DOCUMENTS

| | | | | |
|---|---|---|---|---|
| 4,414,537 A | 11/1983 | Grimes | ....................... | 340/365 |
| 5,818,437 A | 10/1998 | Grover et al. | ............... | 345/326 |
| 5,880,712 A | 3/1999 | Goldman | ..................... | 345/168 |
| 5,953,693 A | 9/1999 | Sakiyama et al. | ............... | 704/3 |
| 5,973,621 A | 10/1999 | Levy | ........................... | 341/22 |
| 6,097,374 A | 8/2000 | Howard | ...................... | 345/168 |
| 6,128,004 A | 10/2000 | McDowall et al. | .......... | 345/158 |
| 6,204,848 B1 | 3/2001 | Nowlan et al. | ............... | 345/352 |
| 6,223,059 B1 | 4/2001 | Haestrup | .................... | 455/566 |
| 6,286,064 B1 | 9/2001 | King | ........................... | 375/365 |
| 6,304,840 B1 | 10/2001 | Vance et al. | ................... | 703/21 |
| 6,307,549 B1 | 10/2001 | King et al. | ................... | 345/352 |
| 6,405,060 B1 | 6/2002 | Schroeder et al. | ........... | 455/566 |
| 6,407,679 B1 | 6/2002 | Evans et al. | .................... | 341/20 |
| 6,567,072 B2 * | 5/2003 | Watanabe | .................... | 345/161 |
| 6,597,345 B2 | 7/2003 | Hirshberg | .................... | 345/168 |
| 6,611,255 B2 | 8/2003 | Griffin et al. | ................. | 345/169 |
| 6,651,052 B1 | 11/2003 | Westphal | ........................ | 707/3 |
| 6,670,894 B2 | 12/2003 | Mehring | ....................... | 341/22 |
| 6,683,599 B2 | 1/2004 | Shepherd et al. | ............. | 345/168 |
| 6,686,852 B1 | 2/2004 | Guo | ............................. | 341/22 |
| 6,704,116 B1 | 3/2004 | Abulhab | ..................... | 358/1.11 |
| 6,741,235 B1 | 5/2004 | Goren | ......................... | 345/173 |
| 6,812,940 B2 | 11/2004 | Arnold | ........................ | 345/817 |

(Continued)

OTHER PUBLICATIONS

"Thumbcode: A Device-Independent Digital Sign Language," Vaughan R. Pratt, http://boole, stanford.edu/thumbcode/ (Abstract Only).

(Continued)

*Primary Examiner*—Henry N Tran
(74) *Attorney, Agent, or Firm*—Heslin Rothenberg Farley & Mesiti P.C.

(57) ABSTRACT

Embodiments of the subject invention relate to systems, methods, and devices providing a reduced number of selectable inputs that enable efficient communication. One aspect of what is disclosed are embodiments of a systematic code, which systematic code enables efficient communication. Another aspect of the invention is the implementation of embodiments of a systematic code on interactive devices, thereby enabling efficient communication using such interactive devices.

19 Claims, 15 Drawing Sheets

TABLE 4A: INPUT SEQUENCES FOR LETTER ENTRIES USING A LEVER DEVICE OR A JOY STICK

| | | | | |
|---|---|---|---|---|
| A 464 - 465 | E 463 - 465 | I 462 - 465 | O 461 - 465 | U 460 - 465 |
| B 464 - 466 | F 463 - 466 | J 462 - 466 | P 461 - 466 | V 460 - 466 |
| C 464 - 467 | G 463 - 467 | K 462 - 467 | Q 461 - 467 | W 460 - 467 |
| D 464 - 468 | H 463 - 468 | L 462 - 468 | R 461 - 468 | X 460 - 468 |
| | | M 462 - 469 | S 461 - 469 | Y 460 - 469 |
| | | N 462 - 470 | T 461 - 470 | Z 460 - 470 |

TABLE 4B: INPUT SEQUENCES FOR NUMERIC ENTRIES USING A LEVER DEVICE OR A JOY STICK

| | |
|---|---|
| 0 472 - 473 | 5 471 - 473 |
| 1 472 - 474 | 6 471 - 474 |
| 2 472 - 475 | 7 471 - 475 |
| 3 472 - 476 | 8 471 - 476 |
| 4 472 - 477 | 9 471 - 477 |

U.S. PATENT DOCUMENTS

| | | | |
|---|---|---|---|
| 7,190,351 B1 | 3/2007 | Goren | 345/173 |
| 7,218,313 B2 | 5/2007 | Marcus et al. | 345/169 |
| 2001/0048425 A1* | 12/2001 | Partridge | 345/161 |
| 2002/0105446 A1 | 8/2002 | Mehring | 341/22 |
| 2002/0145589 A1* | 10/2002 | Tree | 345/156 |
| 2002/0150874 A1* | 10/2002 | Singh et al. | 434/340 |
| 2004/0055446 A1 | 3/2004 | Robbins et al. | 84/615 |
| 2005/0022140 A1 | 1/2005 | Vale | 715/864 |
| 2005/0231486 A1* | 10/2005 | Wiggeshoff | 345/168 |
| 2006/0142046 A1* | 6/2006 | Badarneh | 455/550.1 |
| 2007/0273648 A1* | 11/2007 | Fussinger | 345/161 |

OTHER PUBLICATIONS

"Flex and Pinch: A Case Study of Whole Hand Input Design for Virtual Environment Interaction," Joseph J. Laviola, Jr. and Robert C. Zeleznik.

"Pinch Keyboard: Natural Text Input for Immersive Virtual Environments," Doug A. Bowman, Vinh Q. Ly and Joshua M. Campbell.

"Phonetic Model for Automatic Recognition of Hand Gestures," Jose L. Hernandez-Rebollar, The George Washington University, Electrical and Computer Engineering.

"Optimality And Opposed Handshapes In Taiwan Sign Language," Ann J. & Peng, L., University of Rochester Working Papers In The Language Sciences, vol. 1, No. 2, pp. 173-194.

* cited by examiner

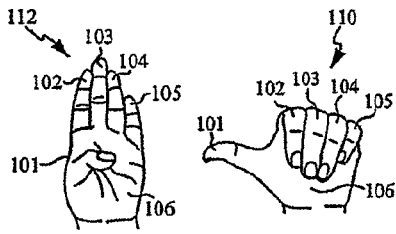
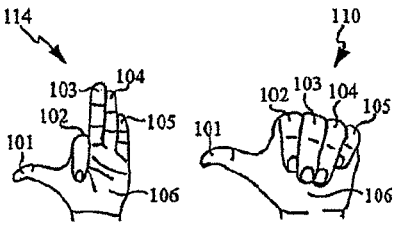

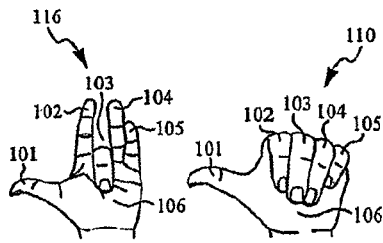
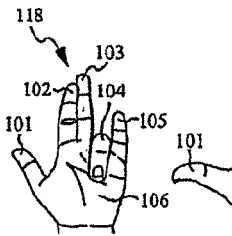
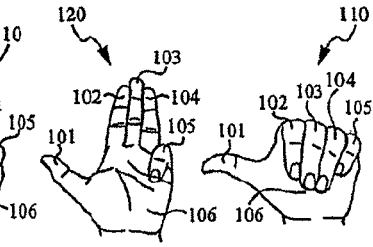

Table 1A: Input Sequences for Letter Entries Using a Sign Language Code

| | | | | |
|---|---|---|---|---|
| A 112-110 | E 114-110 | I 116-110 | O 118-110 | U 120-110 |
| B 112-112 | F 114-112 | J 116-112 | P 118-112 | V 120-112 |
| C 112-114 | G 114-114 | K 116-114 | Q 118-114 | W 120-114 |
| D 112-116 | H 114-116 | L 116-116 | R 118-116 | X 120-116 |
| | | M 116-118 | S 118-118 | Y 120-118 |
| | | N 116-120 | T 118-120 | Z 120-120 |

Table 1B: Input Sequences for Numeric Entries Using a Sign Language Code

| | |
|---|---|
| 0 112-110 | 5 114-110 |
| 1 112-112 | 6 114-112 |
| 2 112-114 | 7 114-114 |
| 3 112-116 | 8 114-116 |
| 4 112-118 | 9 114-118 |

Table 1C: Input Sequences for Puncutation Marks and Commands Using a Sign Language Code

| | |
|---|---|
| End of Word/Space: | Tip of thumb to tip of index finger |
| Period: | Tip of thumb to tip of middle finger |
| Comma: | Tip of thumb to tip of ring finger |
| Question Mark: | Tip of thumb to tip of small finger |
| Backspace: | Tip of thumb to side of index finger |

Table 2A: Input Sequences for Letter Entries Using a Hand-Mounted Device

| | | | | |
|---|---|---|---|---|
| A 212-210 | E 214-210 | I 216-210 | O 218-210 | U 220-210 |
| B 212-212 | F 214-212 | J 216-212 | P 218-212 | V 220-212 |
| C 212-214 | G 214-214 | K 216-214 | Q 218-214 | W 220-214 |
| D 212-216 | H 214-216 | L 216-216 | R 218-216 | X 220-216 |
| | | M 216-218 | S 218-218 | Y 220-218 |
| | | N 216-220 | T 218-220 | Z 220-220 |

Table 2B: Input Sequences for Numeric Entries Using a Hand-Mounted Device

| | | | | |
|---|---|---|---|---|
| 0 212-210 | 5 214-210 | 10 216-210 | 15 218-210 | 20 220-210 |
| 1 212-212 | 6 214-212 | 11 216-212 | 16 218-212 | 21 220-212 |
| 2 212-214 | 7 214-214 | 12 216-214 | 17 218-214 | 22 220-214 |
| 3 212-216 | 8 214-216 | 13 216-216 | 18 218-216 | 23 220-216 |
| 4 212-218 | 9 214-218 | 14 216-218 | 19 218-218 | 24 220-218 |

Table 3A: Input Sequences for Letter Entries Using a Mouse

| | | | | |
|---|---|---|---|---|
| A 302-301 | E 303-301 | I 304-301 | O 305-301 | U 306-301 |
| B 302-302 | F 303-302 | J 304-302 | P 305-302 | V 306-302 |
| C 302-303 | G 303-303 | K 304-303 | Q 305-303 | W 306-303 |
| D 302-304 | H 303-304 | L 304-304 | R 305-304 | X 306-304 |
| | | M 304-305 | S 305-305 | Y 306-305 |
| | | N 304-306 | T 305-306 | Z 306-306 |

Table 3B: Input Sequences for Numeric Entries Using a Mouse

| | |
|---|---|
| 0 302-301 | 5 303-301 |
| 1 302-302 | 6 303-302 |
| 2 302-303 | 7 303-303 |
| 3 302-304 | 8 303-304 |
| 4 302-305 | 9 303-305 |

Table 3C: Input Sequences for Numeric Entries Using a Mouse

| | | | | |
|---|---|---|---|---|
| 0 302-301 | 5 303-301 | 10 304-301 | 15 305-301 | 20 306-301 |
| 1 302-302 | 6 303-302 | 11 304-302 | 16 305-302 | 21 306-302 |
| 2 302-303 | 7 303-303 | 12 304-303 | 17 305-303 | 22 306-303 |
| 3 302-304 | 8 303-304 | 13 304-304 | 18 305-304 | 23 306-304 |
| 4 302-305 | 9 303-305 | 14 304-305 | 19 305-305 | 24 306-305 |

TABLE 4A: INPUT SEQUENCES FOR LETTER ENTRIES USING A LEVER DEVICE OR A JOY STICK

A 464 - 465  E 463 - 465  I 462 - 465  O 461 - 465  U 460 - 465
B 464 - 466  F 463 - 466  J 462 - 466  P 461 - 466  V 460 - 466
C 464 - 467  G 463 - 467  K 462 - 467  Q 461 - 467  W 460 - 467
D 464 - 468  H 463 - 468  L 462 - 468  R 461 - 468  X 460 - 468
                          M 462 - 469  S 461 - 469  Y 460 - 469
                          N 462 - 470  T 461 - 470  Z 460 - 470

TABLE 4B: INPUT SEQUENCES FOR NUMERIC ENTRIES USING A LEVER DEVICE OR A JOY STICK 0 472 - 473   5 471 - 473
1 472 - 474   6 471 - 474
2 472 - 475   7 471 - 475
3 472 - 476   8 471 - 476
4 472 - 477   9 471 - 477

Table 5A: Input Sequences for Letter Entries Using a 12 Position Keypad

| | | | | |
|---|---|---|---|---|
| A 502-501 | E 503-501 | I 504-501 | O 505-501 | U 506-501 |
| B 502-502 | F 503-502 | J 504-502 | P 505-502 | V 506-502 |
| C 502-503 | G 503-503 | K 504-503 | Q 505-503 | W 506-503 |
| D 502-504 | H 503-504 | L 504-504 | R 505-504 | X 506-504 |
| | | M 504-505 | S 505-505 | Y 506-505 |
| | | N 504-506 | T 505-506 | Z 506-506 |

Table 5B: Input Sequences for Numeric Entries Using a 12 Position Keypad

| | |
|---|---|
| 0 501-501 | 5 502-501 |
| 1 501-502 | 6 502-502 |
| 2 501-503 | 7 502-503 |
| 3 501-504 | 8 502-504 |
| 4 501-505 | 9 502-505 |

Table 5C: Input Sequences for Numeric Entries Using a 12 Position Keypad

| | | | |
|---|---|---|---|
| 0 501-501 | 10 502-501 | ............ | 90 511-501 |
| 1 501-502 | 11 502-502 | ............ | 91 511-502 |
| 2 501-503 | 12 502-503 | ............ | 92 511-503 |
| 3 501-504 | 13 502-504 | ............ | 93 511-504 |
| 4 501-505 | 14 502-505 | ............ | 94 511-505 |
| 5 501-506 | 15 502-506 | ............ | 95 511-506 |
| 6 501-507 | 16 502-507 | ............ | 96 511-507 |
| 7 501-508 | 17 502-508 | ............ | 97 511-508 |
| 8 501-509 | 18 502-509 | ............ | 98 511-509 |
| 9 501-511 | 19 502-511 | ............ | 99 511-511 |

Table 6A: Input Sequences for Letter Entries Using a 15 Position Keypad

| | | | | |
|---|---|---|---|---|
| A 601-606 | E 602-606 | I 603-606 | O 604-606 | U 605-606 |
| B 601-601 | F 602-601 | J 603-601 | P 604-601 | V 605-601 |
| C 601-602 | G 602-602 | K 603-602 | Q 604-602 | W 605-602 |
| D 601-603 | H 602-603 | L 603-603 | R 604-603 | X 605-603 |
| | | M 603-604 | S 604-604 | Y 605-604 |
| | | N 603-605 | T 604-605 | Z 605-605 |

Table 6B: Input Sequences for Numeric Entries Using a 15 Position Keypad 0 601-601    5 602-601
    1 601-602    6 602-602
    2 601-603    7 602-603
    3 601-604    8 602-604
    4 601-605    9 602-605

Table 6C: Input Sequences for Numeric Entries Using a 15 Position Keypad

| 0 601-601 | 10 602-601 | ......... | 90 610-601 |
| 1 601-602 | 11 602-602 | ......... | 91 610-602 |
| 2 601-603 | 12 602-603 | ......... | 92 610-603 |
| 3 601-604 | 13 602-604 | ......... | 93 610-604 |
| 4 601-605 | 14 602-605 | ......... | 94 610-605 |
| 5 601-606 | 15 602-606 | ......... | 95 610-606 |
| 6 601-607 | 16 602-607 | ......... | 96 610-607 |
| 7 601-608 | 17 602-608 | ......... | 97 610-608 |
| 8 601-609 | 18 602-609 | ......... | 98 610-609 |
| 9 601-610 | 19 602-610 | ......... | 99 610-610 |

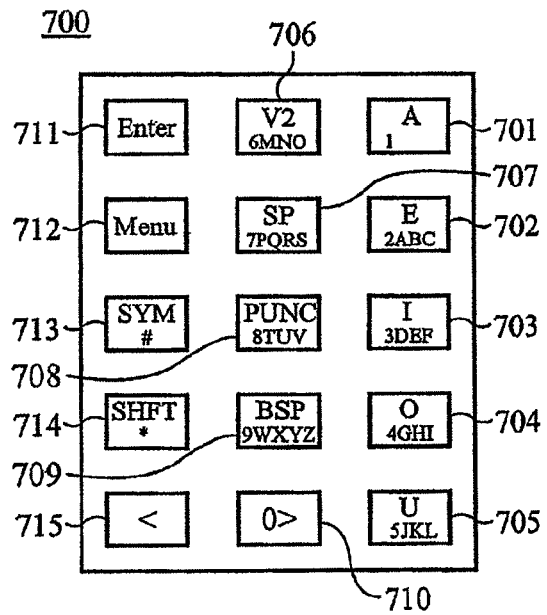
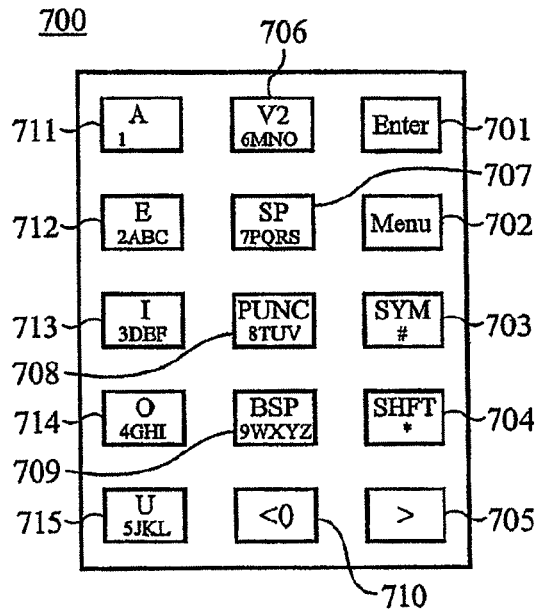
*Fig. 7A*          *Fig. 7B*
Table 7A: Input Sequences for Vowels for 5 Key Control Input Keypad of Fig. 7A
    A  701-706
    E  702-706
    I  703-706
    O  704-706
    U  705-706
Table 7B: Input Sequences for Vowels for 5 Key Control Input Keypad of Fig. 7B
    A  711-706
    E  712-706
    I  713-706
    O  714-706
    U  715-706

INPUT DEVICE AND METHOD FOR ENTERING DATA EMPLOYING A TOGGLE INPUT CONTROL

CROSS-REFERENCE TO RELATED APPLICATIONS

This application is a continuation of U.S. patent application Ser. No. 10/852,739, filed May 24, 2004, entitled "Systems, Methods And Devices For Efficient Communication Utilizing A Reduced Number Of Selectable Inputs," the entirety of which is hereby incorporated herein by reference.

This application contains subject matter which is related to the subject matter of the following applications. Each of the below listed applications is hereby incorporated herein by reference in its entirety:

"Devices Having Input Controls For Efficient Input Of Data," Michael Goren, U.S. Ser. No. 11/316,079, filed Dec. 22, 2005; and "Method, User Interfaces And Devices For Inputting Data Employing Common Input Keys," Michael Goren, U.S. Ser. No. 11/316,896, filed Dec. 22, 2005.

TECHNICAL FIELD

The present invention relates to systems, methods, and devices providing a reduced number of selectable inputs that enable efficient communication. One aspect of what is disclosed are embodiments of a sign language code enabling efficient non-verbal communication. Another aspect of the invention is the implementation of embodiments of a systematic code on interactive devices, thereby enabling efficient communication using such interactive devices.

BACKGROUND OF THE INVENTION

The embodiments of the invention disclosed herein are systems, methods, and devices providing a reduced number of selectable inputs that enable efficient communication, where such communication is taken to broadly encompass the exchange of thoughts, messages, information, etc., by signals, writing, speech, etc. For some embodiments, the systems, methods, and devices may be manually signed without a device, providing efficient non-verbal communication. For other embodiments, the systems, methods, and devices for efficient communication are implemented on an interactive device. What is meant by interactive device is a device that responds to user activity, where the activity may be related to various stimuli, such as mechanical, light, or sound, or related to human senses such as touch, sight, or hearing and the like.

The foundation of systems, methods, and devices for efficient communication disclosed herein has been described in Goren Ser. No. 09/592,323, and is based on a binary code of a primary, or control input, followed by a secondary input. The control input is associated with an entry chosen from the set of letters, numbers, characters, symbols, punctuation marks, commands, and the like. Associated with the control input are secondary inputs chosen from a larger set of letters, numbers, characters, symbols, punctuation marks, and the like. The sequential execution of a control input followed by a secondary input is then the unique signature for a letter, number, character, symbol, punctuation mark, command, and the like.

In some embodiments, a system and method based on the binary code of control and secondary inputs is the basis of a sign language code. Embodiments of such a sign language code having a reduced number of selectable inputs may be used independent of any device, thereby enabling efficient non-verbal communication. Additionally, unlike the American Sign Language, the British Sign Language and its offshoot, the Deafblind Manual Alphabet, the embodiments of the invention disclosed herein use a sign language code for efficient communication that does not rely upon ambiguous one or two-handed hand movements that thereby create ambiguous characters. Embodiments of the sign language code disclosed herein utilize a series of two finger movements, of which each set of two finger movements is a unique signature for each letter of the alphabet, or number, etc. Further, all of the letters of the alphabet, or numbers, etc., may be communicated utilizing only one hand. Embodiments of the sign language code are suited for implementation on an interactive device.

In other embodiments, the systems, methods, and devices providing a reduced number of selectable inputs enable efficient communication on interactive devices. Currently, interactive devices, including telecommunication, computation, control, and recreational devices are increasingly becoming compact and mobile. These interactive devices include personal digital assistants (PDAs), watches, mobile phones, pagers, e-mail devices, web appliances, web tablets, tablet PCs, game devices, and remote controls, by way of example. Many of these interactive devices are increasingly becoming wirelessly interconnected.

Input into interactive devices may be accomplished by input devices that are actuated mechanically, or by a variety of other stimuli, such as light and sound. In that regard, human user input may be manually actuated, or otherwise mechanically actuated by sensors associated with hand or eye movement, or voice actuated, or combinations thereof. Likewise, such interactive devices may respond to a human user with output that is mechanical, audial, or visual in nature, or combinations thereof. As will be discussed in more detail subsequently, given the various sensory modes that input may be entered and output may be manifested using an interactive device, embodiments of the systems, methods, and devices of the invention disclosed herein may be suited to assistive technologies. Though embodiments of the systems, methods, and devices of the disclosed invention are suited for human use, they are also amenable for use with automated systems.

In one aspect of what is contemplated, input into such interactive devices may be actuated using a variety of manually activated devices. One example of embodiments of manually activated devices are a hand mounted device having contacts or sensors, texting mouse, or a full-sized control lever or joy stick, or the like. Some embodiments of the subject invention address a need for enabling efficient communication on interactive devices having reduced-size input components. Such reduced-size input components currently have several drawbacks relating to critical user interface issues, such as ergonomic comfort, accuracy, and speed of inputting. In some aspects of what is contemplated, exemplary smaller manually activated input components may be a variety of switches, such as toggle, pushbutton, slide, rocker, rotary, or LCD programmable switches, or reduced-size control levers or joy sticks, and the like. In other aspects of what is contemplated, exemplary smaller input components may be touch screens, keypads, touch pads, and keyboards, and the like, which are commonly used for entering or inputting thoughts, messages, information, etc into smaller interactive devices.

One set of approaches for inputting thoughts, messages, information, etc into smaller interactive devices has been to utilize the full capability of a QWERTY keyboard in a reduced format form. For instance, touch-sensitive keyboards or smaller keyboards on smaller screens of compact interactive devices have been used, resulting in keys too small for ergonomic comfort. Additionally, there is an increase in error rate and decrease in input rate associated with these smaller keyboards, due to the accidental touch by the user of more than one key at a time. Still another approach involves providing a reduced-size QWERTY keyboard that utilizes a thumb board. For many, thumbing on a reduced-size QWERTY keyboard is awkward, resulting in that approach failing to meet the ergonomic comfort criteria, and additionally resulting in a decreased input rate.

Still other approaches utilize keypads as input components. Keypads are common on compact interactive devices, such as personal digital assistants (PDAs), watches, mobile phones, pagers, e-mail devices, web appliances, web tablets, tablet PCs, game devices, and remote controls, etc. An example of an approach for making entries on keypad devices includes disambiguating methods such as multi-tapping on a key until the desired letter on that key is displayed. For example, the letter "r" is displayed by tapping three times on the "7" key. With a disambiguating program, lists of words are created from the matching of the sequence of keystrokes to complete dictionaries. A number of keypad entry devices utilize a software program to disambiguate the plurality of letters appearing on the keys of such device. A disambiguating computer processes an entered keystroke sequence by matching the different combinations of letters associated with each keystroke to a stored list of words. The words matching the combinations of letters are then displayed for user selection. This method requires a user to enter a combination of keystrokes and then choose from a list of words. The list the user must select from is often quite long requiring the user to read through each potential choice to find the desired word. This type of input, while reducing the error rate associated with the stylus, is much slower and often frustrating to the user due to the need to press a sequence of keys and then filter through a list of computer generated choices. Other limitations of disambiguating methods include limiting the user to the set of choices provided by the computer, as well as being limited when more than one language is used.

It is thereby desirable to create additional systems, methods, and devices using a small set of inputs that are effective in providing accuracy and ease of communication. Such systems, methods, and devices may be used independent of any device to provide efficient non-verbal communication. However, it is desirable that embodiments of the systems, methods, and devices of the subject invention be further compatible with a broad range of compact interactive devices in order to provide ease of use and ergonomic comfort, as well as to fulfill the goal of portability, interconnectivity, and flexible for use with a variety of applications and other software programs.

SUMMARY OF THE INVENTION

The present invention is directed to efficient systems, methods, and devices of communication; e.g. systems, methods, and devices for sending, receiving, displaying, and saving thoughts, messages, information, etc., efficiently. One aspect of embodiments of the subject invention relates to non-verbal communication where no device is necessary. In other embodiments, the systems, methods, and devices are implemented on an interactive device, where input is typically manually actuated, or otherwise mechanically actuated by sensors associated with hand or eye movement, or voice actuated, or combinations thereof. Moreover, where manual actuation is indicated, it is desirable that embodiments of the systems, methods, and devices of the subject invention be adapted for convenience of input using a single hand.

Embodiments of systems, methods, and devices of a sign language code are disclosed that require no device, but are suited for implementation on a variety of interactive devices. Embodiments of the sign language code are created using a binary sequence of thumb and finger movements which are assigned to letters, numbers, characters, symbols, punctuation marks, commands, and the like. In some embodiments, one hand is used is used to create the code, while alternative embodiments may use both hands.

The embodiments of the sign language code of the subject invention are easy to learn. The ease of learning is illustrated by using communication of letters, as an example: (1) there are only five vowels, which are the basis of the control inputs; (2) each vowel has a set of no more than five associated consonants, which are secondary inputs; (3) each vowel is associated with a finger, for example: A: thumb, E: index finger, I: middle finger, O: ring finger, and U: small finger; (4) the first finger movement is associated with the control input of a vowel and the second finger movement identifies the secondary input of the letter associated with the control input. In this fashion, the signing of a control input followed by the signing of a secondary input is the unique signature for a letter. This method may also be extended to numbers, characters, symbols, punctuation marks, commands, and the like.

For interactive devices, inputs and outputs may be displayed on a display device, such as a display screen. Such devices may have one or more display screens. The display screens are useful for two purposes. First, they may be used for viewing control inputs or secondary inputs of letters, numbers, characters, symbols, punctuation marks, commands, and the like for selection by the user. Second, they may display the text, symbols, or commands, etc. that have been inputted for further processing, such as editing, before the entering, sending, or storing the input. It is further contemplated that instead of a display device, such as one or more display screens, the interactive device may have, for example, voice chip capabilities, so that input and output are communicated via sound. It is still further contemplated that the interactive device may have mechanical means, such as vibration, for communicating to the user. In this regard, though the systems, methods, and devices of the disclosed invention may be used by a variety of end-users, they are suited for assistive technologies.

Each manually actuated control input is selected from a set of letters, numbers, characters, symbols, punctuation marks, commands, and the like, and may be displayed on a display device, or the like, as discussed in the above. The control input initially may be identified or assigned a single control input character, and is associated with a selection of secondary inputs that encompass a larger set of letters, numbers, characters, symbols, punctuation marks, commands, and the like. After entering a specific control input, a secondary input is selected and entered on the input device. In this fashion, the entering of a control input followed by the entering of a secondary input is the unique signature for an inputted entry chosen from a set of letters, numbers, characters, mathematical symbols, punctuation marks, and the like. This well defined association between control and secondary inputs and inputted entries allows the user to easily and efficiently input text, numbers, symbols, commands, etc. to a variety of devices.

When the embodiments of the systems, methods, and devices of the subject invention are implemented on interactive devices, the control inputs and secondary inputs can be entered by a number of manually actuated devices, for example: 1.) hand-mounted devices actuated by hand movements, such as a glove with contacts or sensors, 2.) actuating pads or buttons on a mouse, 3.) switches, lever devices, or joy sticks, and the like, or 4.) keys on a keypad or keyboard, or touch screen, etc. Using the systems, methods, and devices disclosed herein, the entries such as letters, numbers, characters, symbols, punctuation marks, commands, and the like, and combinations thereof are easily entered into an interactive device in a simple, consistent, and predetermined manner.

Accordingly, embodiments of the systems, methods, and devices disclosed herein address a need in the art for efficient communication, either with or without the use of an interactive device. In the case of the use of smaller interactive devices, a need to take into account important user interface issues, such as ergonomic comfort, as well as accuracy and speed of inputting, is specifically addressed.

BRIEF DESCRIPTION OF THE DRAWINGS

FIGS. 1A-1E show examples of communicating information using hand signals.

Table 1A displays an embodiment of a sign language code for communicating letters using hand signing.

Table 1B displays an embodiment of a sign language code for communicating numbers using hand signing.

Table 1C displays an embodiment of a sign language code for communicating punctuation marks and commands using hand signing.

FIGS. 2A-2F show an embodiment of a device for manual actuation of input to interactive devices using embodiments of systems, methods, and devices for efficient communication.

Figure 2A:
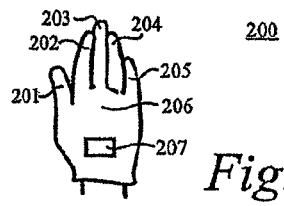
Figure 2B:
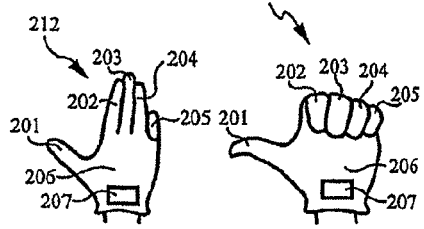
Figure 2C:
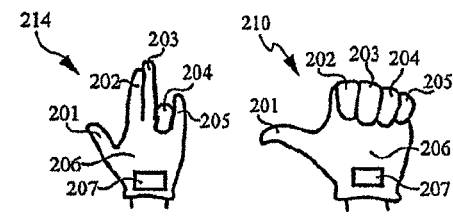
Figure 2D:
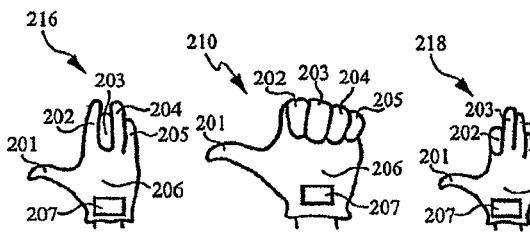
Figure 2E:
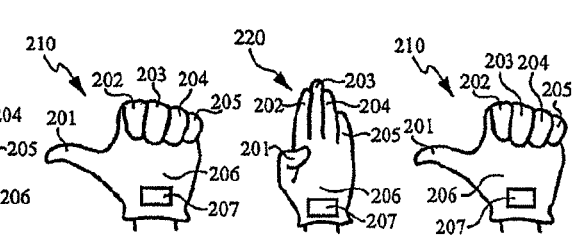
Figure 2F:
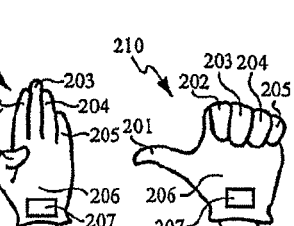

Table 2A displays an embodiment of inputting letter entries into interactive devices using a manually actuated input device, such as that of FIG. 2A.

Table 2B displays an embodiment of inputting numeric entries into interactive devices using a manually actuated input device, such as that of FIG. 2A.

Figure 3:
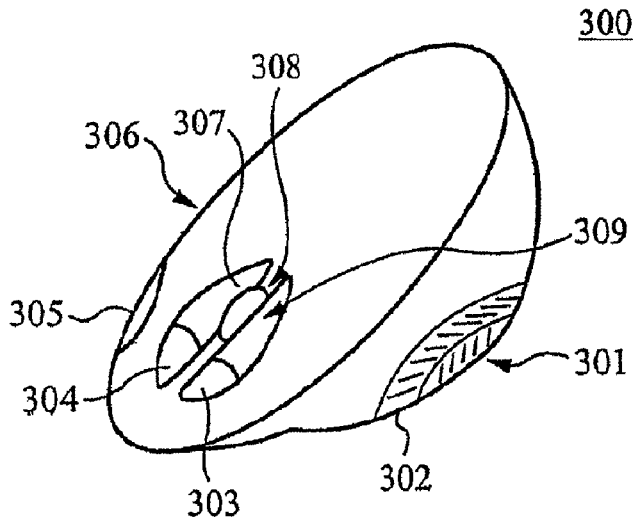

FIG. 3 is an embodiment of a mouse for manual actuation of input to interactive devices using embodiments of systems, methods, and devices for efficient communication.

Table 3A displays an embodiment of an input sequence for alphabet entries using the mouse of FIG. 3.

Table 3B displays an embodiment of an input sequence for numeric entries using the mouse of FIG. 3.

Table 3C displays an alternative embodiment of an input sequence for numeric entries using the mouse of FIG. 3.

Figure 4A:
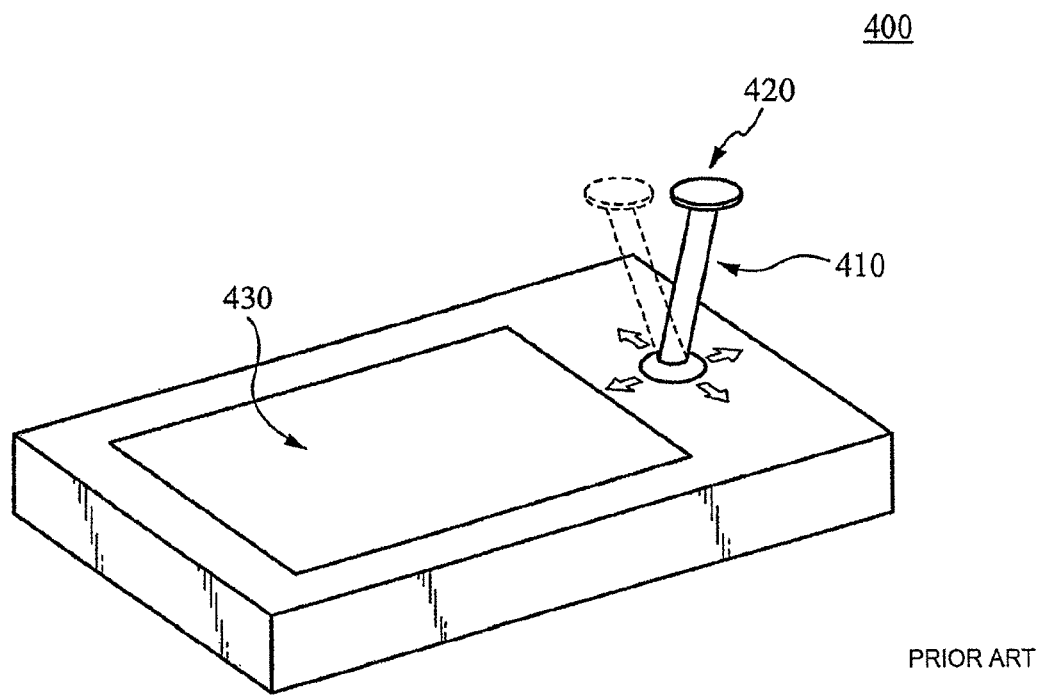

FIG. 4A shows an embodiment of a device with a control lever for manual actuation of input to interactive devices using embodiments of systems, methods, and devices for efficient communication.

Figure 4B:
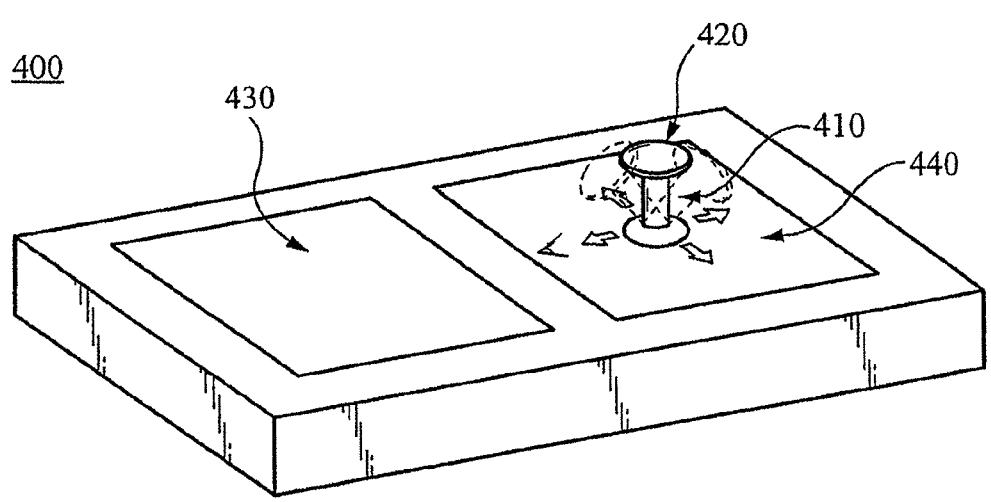

FIG. 4B shows an alternative embodiment of a device with a control lever for manual actuation of input to interactive devices using embodiments of systems, methods, and devices for efficient communication.

Figure 4C:
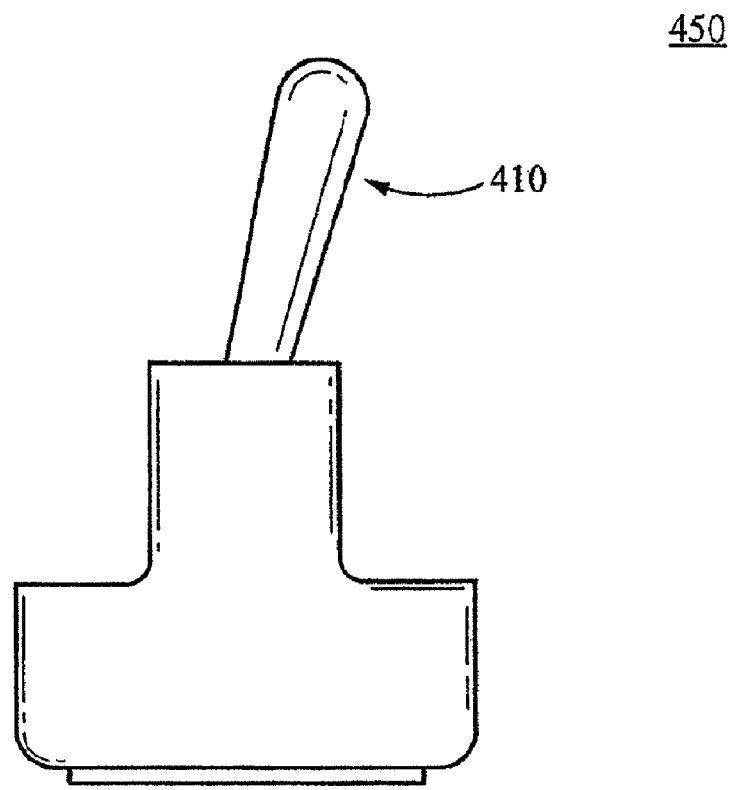

FIG. 4C shows an embodiment of a toggle switch for manual actuation of input to interactive devices using embodiments of systems, methods, and devices for efficient communication.

Figure 4D:
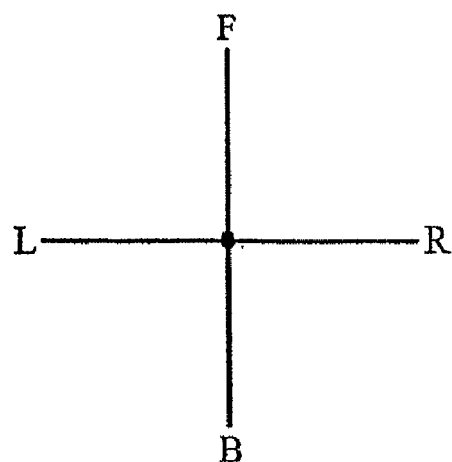

FIG. 4D shows a diagram of toggle switch positions, when the switch is viewed from the top.

Figure 4E:
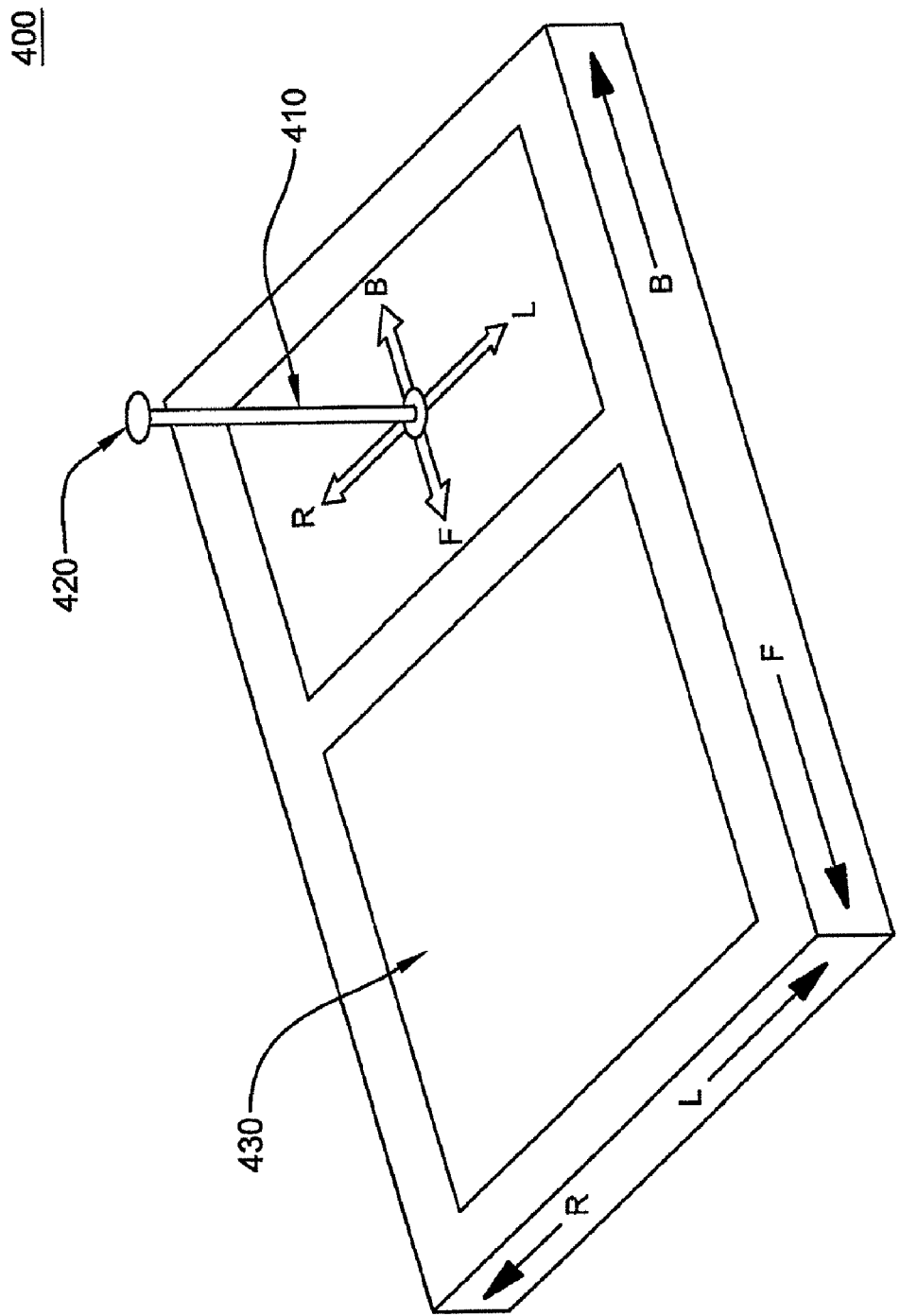

FIG. 4E depicts one example of a device with an input control movable in various directions, in accordance with an aspect of the present invention.

Figure 4F:
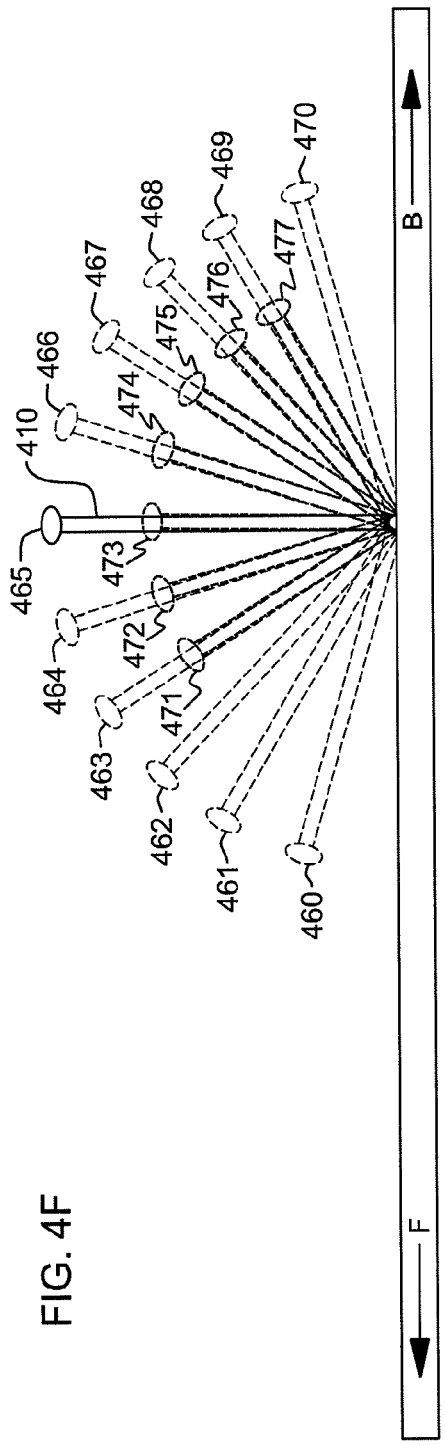

FIG. 4F depicts examples of the input control of FIG. 4E toggling through positions, in accordance with an aspect of the present invention.

Table 4A displays an embodiment of inputting letter entries using the input control of FIG. 4F, in accordance with an aspect of the present invention.

Table 4B displays an embodiment of inputting numeric entries using the input control of FIG. 4F, in accordance with an aspect of the present invention.

Figure 5A:
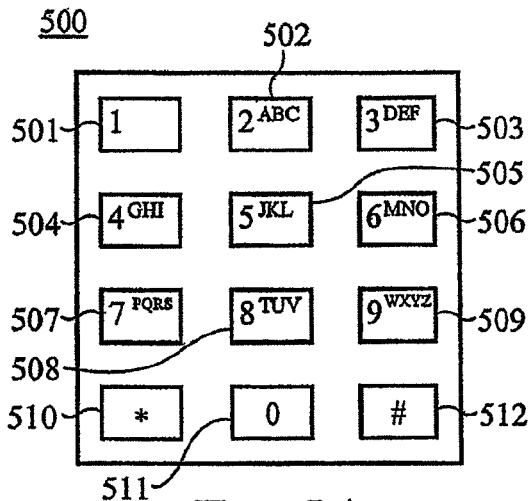
Figure 5B:
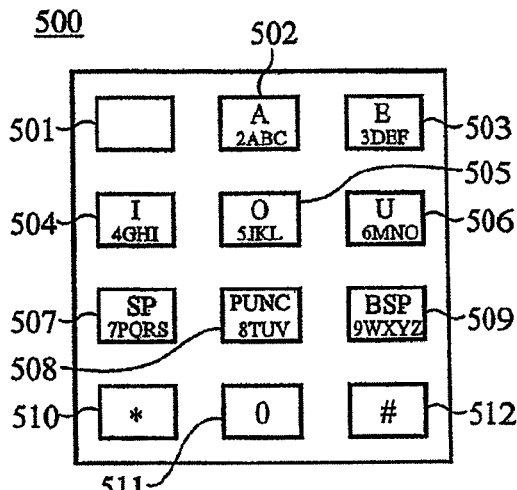

FIGS. 5A and 5B are 12 position keypads in a 3×4 array, for manual actuation of input to interactive devices using embodiments of systems, methods, and devices for efficient communication. FIG. 5A is a standard 12 position keypad, and Fig. B is an alternative embodiment of a 12 position keypad for inputting information.

Table 5A displays an embodiment of inputting letter entries using the keypads of FIGS. 5A and 5B.

Table 5B displays an embodiment of inputting numeric entries using the keypads of FIGS. 5A and 5B.

Table 5C displays an alternative embodiment of inputting numeric entries using the keypads of FIGS. 5A and 5B.

Figure 6:
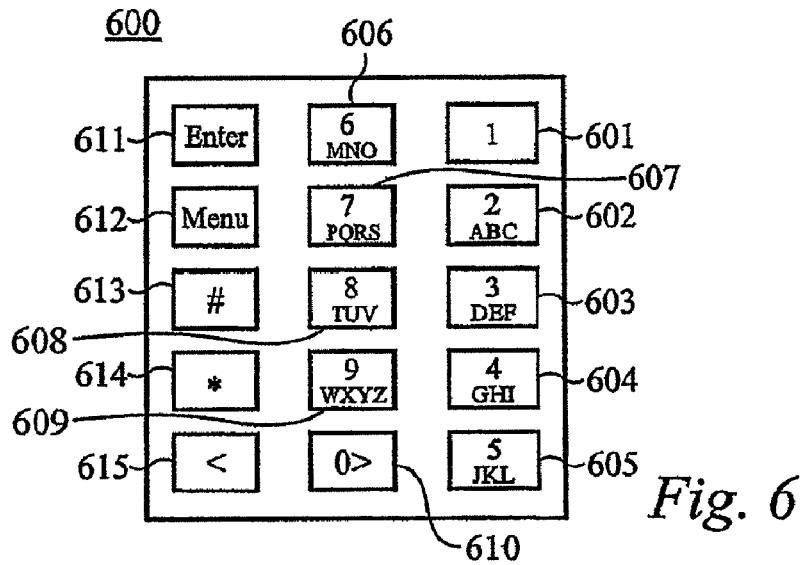

FIG. 6 is a standard 15 position keypad in a 3×5 array, for manual actuation of input to interactive devices using embodiments of systems, methods, and devices for efficient communication.

Table 6A displays an embodiment of inputting letter entries using the keypad of FIG. 6.

Table 6B displays an embodiment of inputting numeric entries using the keypad of FIG. 6.

Table 6C displays an alternative embodiment of inputting numeric entries using the keypad of FIG. 6.

FIGS. 7A and 7B show alternative embodiments of a 15 position keypad for manual actuation of input to interactive devices using embodiments of systems, methods, and devices for efficient communication.

Table 7A displays an embodiment of inputting vowels using the keypad of FIG. 7A.

Table 7B displays an embodiment of inputting vowels using the keypad of FIG. 7B.

Figure 8A:
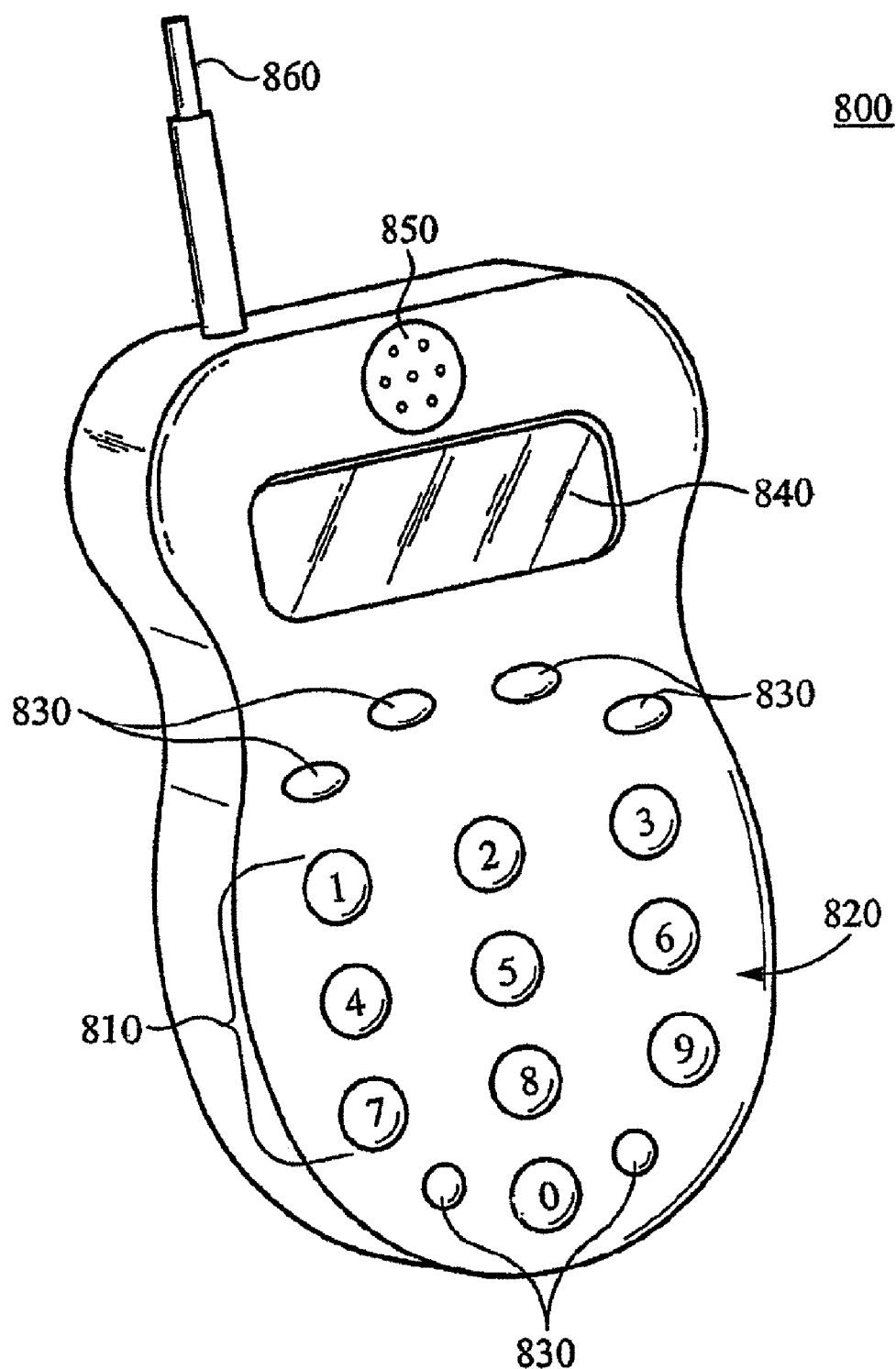

FIG. 8A is an embodiment of an exemplary mobile communication device that may utilize embodiments of the systems, methods, and devices disclosed herein.

Figure 8B:
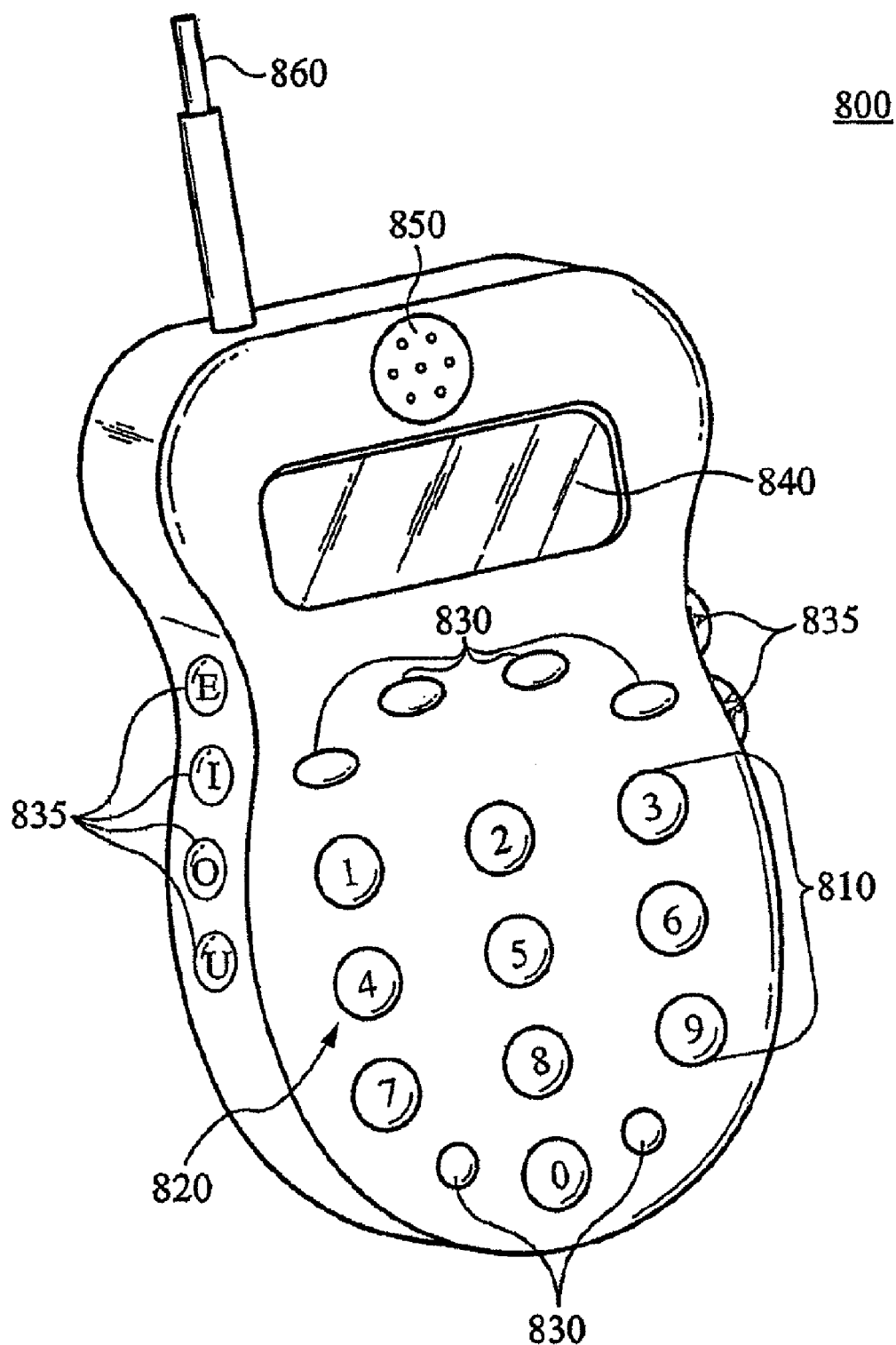

FIG. 8B is an alternative embodiment of an exemplary mobile communication device that may utilize embodiments of the systems, methods, and devices disclosed herein.

Figure 8C:
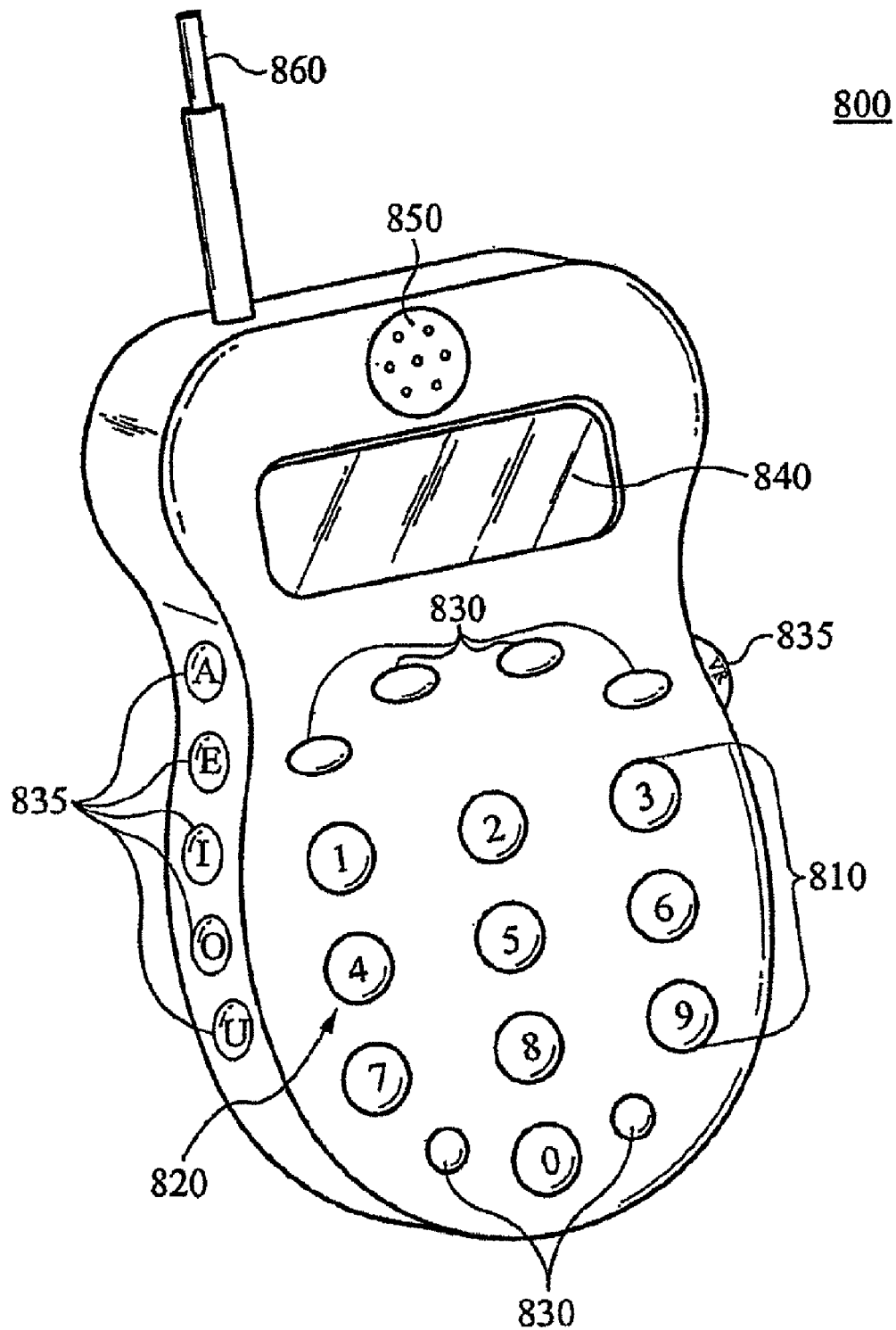

FIG. 8C is still another embodiment of an exemplary mobile communication device that may utilize embodiments of the systems, methods, and devices disclosed herein.

Figure 9A:
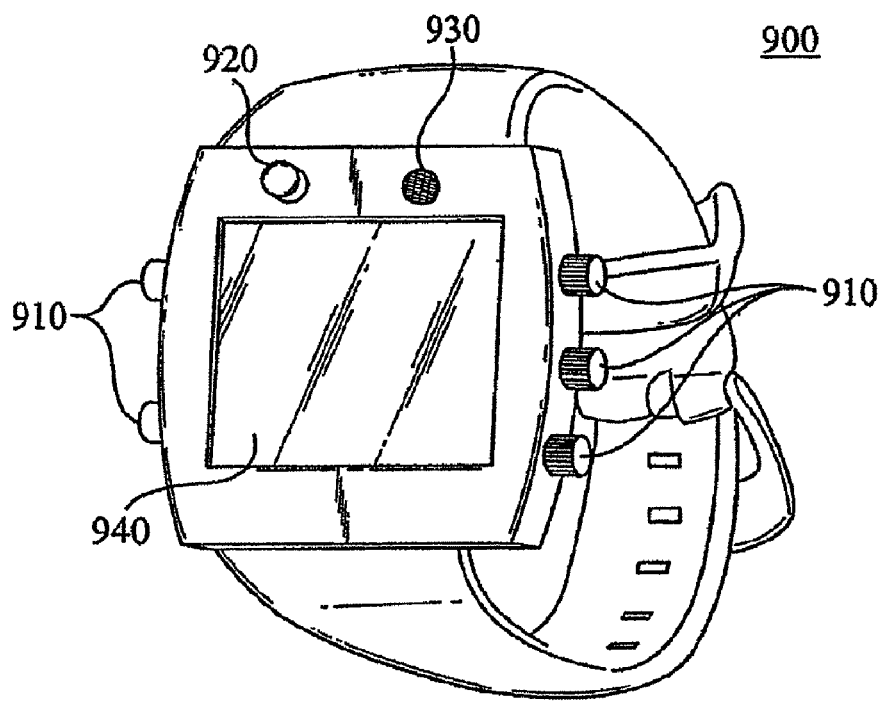

FIG. 9A is an embodiment of an exemplary PDA watch device that may utilize embodiments of the systems, methods, and devices disclosed herein.

Figure 9B:
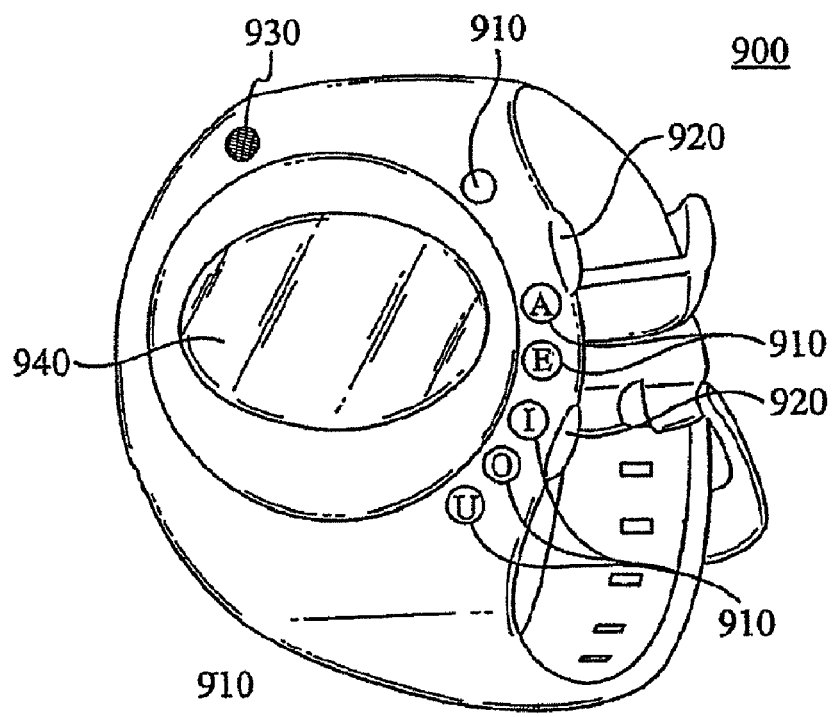

FIG. 9B is an alternative embodiment of an exemplary PDA watch device that may utilize embodiments of the systems, methods, and devices disclosed herein.

Figure 9C:
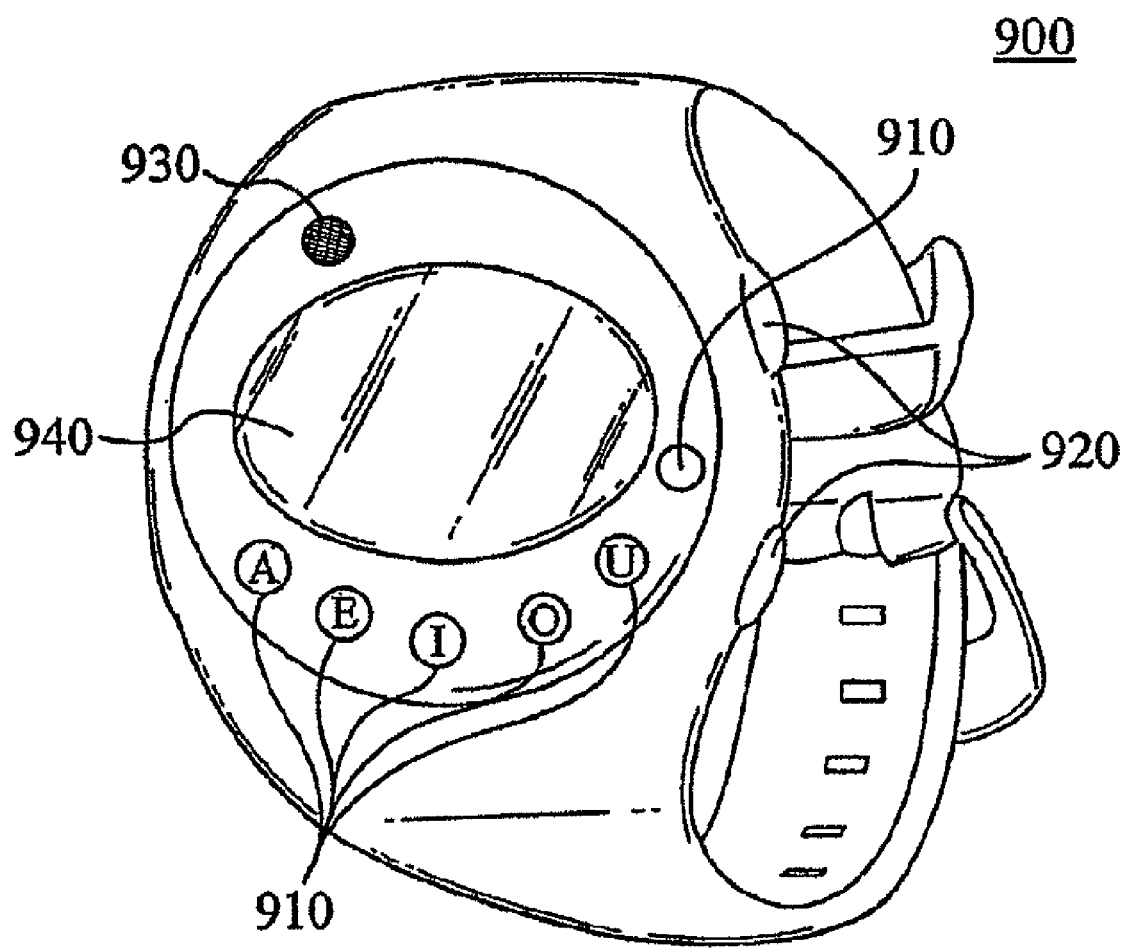

FIG. 9C is still another embodiment of an exemplary PDA watch device that may utilize embodiments of the systems, methods, and devices disclosed herein.

BEST MODE FOR CARRYING OUT THE INVENTION

Sign Language Code

Embodiments of the sign language code are based upon a first finger movement that identifies a control input chosen from a set of letters, numbers, characters, mathematical symbols, punctuation marks, commands, and the like, followed by a second finger movement identified with a secondary input chosen from a larger set of letters, numbers, characters, mathematical symbols, punctuation marks, commands, and the like. In this fashion, the signing of a control input followed by the signing of a secondary input is the unique sign for a letter, number, character, symbol, punctuation mark, command, and the like. One embodiment of the sign language code uses one hand to create letters, numbers, etc. for communicating, while alternative embodiments may use both hands.

One embodiment of the sign language code is shown in FIGS. 1A-1E. In Table 1A, an embodiment of the sign language code for the alphabet is shown. For the control inputs, the thumb 101 and fingers 102-105 are each assigned a single letter representing a vowel. Associated with each vowel are not more than five consonants. As can be seen in FIGS. 1A-1E, the thumb 101 touched to the palm 106, is the control input for the letter "A" 112. Similarly, index finger 102 touched to the palm 106, is the control input for the letter "E" 114, while the middle finger 103 touched to the palm 106 is the control input for the letter "I" 116; the ring finger 104 touched to the palm 106 is the control input for the letter "O" 118; and finally, the little finger 105 touched to the palm 106 is the control input for the letter "U" 120.

Further, each of the control inputs is associated with a set of second inputs, and as can be seen in Table 1A. In the embodiment of FIGS. 1A-1E, the secondary input for entering vowels is the touching of a plurality of fingers 102-105 to the palm 106, represented in FIGS. 1A-1E as 110. Table 1A displays the control and secondary inputs for entering letters using one embodiment of the sign language code for communication. Shown in Table 1B is an embodiment of control inputs and secondary inputs for communicating numbers. Various ways of communicating numbers will be discussed in more detail subsequently.

FIGS. 1A-1E depict an embodiment of the sign language code using one hand, for ease of use to the end user. Variations of this will be apparent to one of skill in the art. For example, in one embodiment of the sign language code, letters may be communicated using one hand, while numbers may be communicated with the other hand. In another embodiment of the sign language code, letters may be communicated with the hand in one position, while numbers are communicated with the hand in another position, and symbols in still another position. In still another example, in some embodiments, letters may be communicated with control inputs and secondary inputs having the thumb and fingers completely touching the palm, while numbers are communicated with the fingers only partially deflected towards the palm. In still other embodiments, fingers touching other fingers or the thumb may be used for the designation of control inputs and secondary inputs, such as the example given in Table 1C for communicating punctuation marks and commands.

As an example of how the sign language code could be used to communicate words, thoughts, and ideas, etc., the greeting, "Good morning", would be communicated as (see table 1A and 1C):

114-114, 118-110, 118-110, 112-116 (tip of thumb to tip of index finger)

116-118, 118-110, 118-116, 116-120, 116-110, 116-120, 114-114

Hand-Mounted Interactive Device

While the sign language code described above requires no interactive device, it is further contemplated in other embodiments where the use of an interactive device is indicated, that there may be no need for a keypad or display screen. In some embodiments, the input component of an interactive device is a hand-mounted device with contacts or sensors, such as the glove of FIG. 2A.

Similarly to the description given for FIGS. 1A-1E, in FIGS. 2B-2F, the thumb 201 and fingers 202-205 are each assigned a single vowel and are used to represent the control inputs. However, a variation of what is depicted in FIGS. 1A-1E is shown in this embodiment. In the embodiment shown in FIGS. 2B-2F, the little finger 205 bent towards the palm 206, is the control input for the letter "A" 212, the ring finger 204 bent towards the palm 206, is the control input for the letter "E" 214, the middle finger 203 bent towards the palm 206, is the control input for the letter "I" 216; the index finger 202 bent towards the palm 206, is the control input for the letter "O" 218; and finally, the thumb 201 bent towards the palm 206, is the control input for the letter "U" 220. Clearly, in this embodiment, two additional variations of the sign language code are utilized: 1.) The partial bending of thumb and fingers vs. the full bending of the fingers for the embodiments of FIGS. 1A-1E. 2.) An alternative sequence of fingers are assigned for the control inputs. These variations are illustrative of the versatility with which embodiments of the sign language code can be created.

As previously described for the embodiments of the sign language code, each of the control inputs is associated with a set of secondary inputs, and as can be seen in Tables 2A and 2B. In the embodiment shown in FIGS. 2B-2F, the secondary input for entering vowels is the partial bending of a plurality of fingers 202-205 towards the palm 206, represented in FIGS. 2B-2F as 210. Table 2A displays the control and secondary inputs for entering letters with this embodiment utilizing a hand-mounted input device, such as the glove of FIG. 2A. This embodiment, and the embodiments of FIGS. 1A-1E, are exemplary of the variety of ways finger movements may be created and assigned to control inputs and secondary inputs for designating letters, numbers, characters, symbols, punctuation marks, commands, and the like, for either the sign language code, or a hand-mounted device.

Shown in Table 2B is an embodiment of control inputs and secondary inputs for inputting numbers on an interactive device using a hand-mounted input device, such as the glove of FIG. 2A. As previously shown in Table 1B for the sign language code, numeric entries can also be entered in a similar manner using a hand-mounted input device. An additional embodiment of control inputs and secondary inputs for either the sign language code, or the hand-mounted input device is shown in Table 2B. Using either of the embodiments of Table 1B or 2B, numeric entries can be ready built for either the sign language code or the hand-mounted input device. As an example, referring to Table 1B and FIGS. 1A-1E, and Table 2B and FIGS. 2B-2F, the number "1948" can be entered as the following string of inputs:

Table 1B: 112-112, 114-118, 112-118, 114-116 or

Table 2B: 218-218; 212-218; 214-216

Additionally, as discussed for the multitude of finger movements possible for the sign language code, since sensors may be placed in a variety of locations on the fingers and hands, it is possible to create unique entries for a variety of sets of characters such as letters, numbers, symbols, punctuation marks, commands, and the like. The arrangement of contact points on a hand-mounted device, such as a glove, is optimized in terms of efficiency and consistency to provide the utility of a keypad for entering a desired character. The predetermined arrangement of contact points is optimized for each embodiment of the method and system disclosed herein. In some embodiments, contacts or sensors may be placed on both hands. In other embodiments, sensors may be placed for the use of eye movements. In still other embodiments, the hand on which the device is mounted may be robotic or prosthetic.

For the hand-mounted, manually actuated embodiments described herein, such as the glove of FIG. 2A, the letters, numbers, characters, symbols, punctuation marks, commands, and the like, are entered by the user, and may be stored using a storage medium and if desired may be displayed on one or more display screens 207, shown in FIGS. 2A-2F. Alternatively, input and output may be communicated to the user via sound, such a voice chip, or via mechanical means, such as vibration, as previously mentioned. Additionally, some embodiments may be capable of networking with other interactive devices, software programs, and the Internet.

Texting Mouse Embodiment

Still other embodiments of the system and method for inputting information use a mouse as the input device. In reference to FIG. 3, keys or pads on a mouse, are arranged efficiently for ease of use for entering data and information. Shown in FIG. 3, pads 301 and 302 are actuated using the thumb, pad 303 is actuated using the index finger, pad 304 is actuated using the middle finger, pad 305 is actuated using the ring finger, and pad 306 (indicated but not shown) is actuated using the little finger.

Each pad 301-306, may be assigned its own respective single letter that represents a control input. In one embodiment, the thumb 302 is assigned the letter "A", the index finger 303 is assigned the letter "E", the middle finger 304 is assigned the letter "I", the ring finger 305 is assigned the letter "O" and the small finger 306 is assigned the letter "U". A user selects one of the control inputs and therefore the letter assigned to that control input by pressing the desired key. As previously described above, the control input for "A" is associated with the ordered set of second inputs A, B, C and D; the control input for "E" is associated with the ordered set of second inputs E, F, G, H; the control input for "I" is associated with the ordered set of second inputs I, J, K, L, M and N; the control input "O" is associated with the ordered set of second inputs O, P, R, S, and T; and the control input "U" is associated with the ordered set of second inputs U, V, W, X, Y and Z. Table 3A displays an embodiment for an input sequence for letters using a mouse.

As previously described for the hand-mounted device, numeric entries can also be entered in a similar manner using a mouse. Tables 3B and 3C display embodiments for input sequences for numbers using a mouse. Using either of the embodiments of Table 3B or 3C, numeric entries can be ready built. As an example, referring to Tables 3B and 3C, the number "1948" can be entered as the following string of inputs:

Table 3B: 302-302, 303-305, 302-305, 303-304; or

Table 3C: 305-305; 302-305; 303-304.

It may be readily appreciated by a person skilled in the art that, since the control input numerals "0" and "5" and their respective associated numerals contain all of the digits to enter a desired number (0, 1, 2, 3, 4, 5, 6, 7, 8, and 9), the number of inputted numerals can range from one to whatever number is desirable. The same reasoning applies to the expanded list of entries shown in Table 3C. Further, analogous to the plurality of embodiments created by the expanded set of finger positions for the sign language code and hand-mounted input device, additional buttons or pads on the mouse may also give rise to alternative embodiments of mouse control input and secondary input combinations. Such expanded embodiments of control inputs and secondary inputs may be useful for creating a wide range of sets of letters, numbers, characters, symbols, punctuation marks, commands, and the like. Additionally, the selected entry may be stored on a storage medium and if desired may be displayed on one or more viewing areas. Alternatively, input and output may be communicated to the user via sound, such a voice chip, or via mechanical means, such as vibration, as previously mentioned.

Switch, Control Lever, Or Joy Stick Entry

Another system and method disclosed that uses input devices such as switches, lever devices, or joy sticks, and the like. FIG. 4A, FIG. 4B, FIG. 4E and FIG. 4F show an input device 400 using a control lever 410. Though the control lever may be grasped by a hand, the end of the control lever is designed for ease of engagement of a single digit, making control with the thumb or a finger possible. FIGS. 4A and 4E-4F show a conventional control lever or joy stick, while FIG. 4B shows an alternative embodiment having a reduced-size control lever, or joy stick. While FIGS. 4A, 4B, 4E and 4F display a control lever or joy stick, it is appreciated by those in the art that numerous switches may also be used in such an input device. The embodiments using switches, lever devices, or joy sticks, and the like, may be used in conjunction with one or more display screens 430, 440, as shown in FIGS. 4A, 4B and 4E, respectively. Alternatively, input and output may be communicated to the user via sound, such a voice chip, or via mechanical means, such as vibration, as previously mentioned.

FIG. 4C shows a toggle switch 410 as an exemplary switch on input device 450, though a wide variety of switches, such as toggle, pushbutton, slide, rocker, rotary, or LCD programmable switches, may be used. FIG. 4C is illustrative of a switch device, such as 450, which may be used without a display screen, or other means utilized by interactive devices for communicating input and output to a user. In such embodiments, the binary code of the systems, methods, and devices of the invention disclosed herein, based on the control inputs and their associated secondary inputs is readily inputted into such devices for efficient communication. Though a switch, such as a toggle switch is used in FIG. 4C as an exemplary device for use without a display screen, etc., those of skill in the art will recognize that numerous types of control levers, and joy sticks, and the like may be likewise used.

FIG. 4D is a diagram of positions for one embodiment of input entered into an interactive device using a switch, lever device, or joy stick. This diagram is viewed from above a switch, lever, or joy stick, such as the lever device of FIGS. 4A, 4B, 4E and 4F, or the toggle switch of FIG. 4C. In this embodiment, the interactive device has an input device of a switch, lever device, or joy stick that is upright in the middle of the input area. As shown in FIG. 4F and Table 4A, the user can move forward, "F", to toggle through vowels, as exemplary control inputs; or back, "B", to toggle through consonants, as exemplary secondary inputs associated with the vowels. Additionally, in this embodiment, the user may toggle left, "L", or toggle right, "R", for inputting, as an example, commands, such as a backspace command (i.e. "L") or for a space command (i.e. "R"). Further, the user can press down, and then engage the switch, control lever, or joy stick in an additional series of control inputs and secondary inputs.

As shown with reference to FIG. 4F and Table 4A, in one embodiment, vowels are inputted by moving a switch, control lever, or joy stick forward, "F": (1) moving slightly forward displays the letter A and (2) moving farther forward scrolls through remaining vowels. When the desired vowel is reached, the user then moves the switch, control lever, or joy stick back to middle position and the device will enter that vowel. Since the list of vowels is short, the user can keep scrolling forward to repeat the list of vowels. For instance, for the A, the switch, control lever, or joy stick is moved forward and the A will be displayed (464). Moving the control lever back to the middle (465) will enter the letter A. For the letter O, the switch, control lever, or joy stick is moved forward until the vowel O is displayed (461), and then move the control lever back to the middle (465).

In a similar fashion, the consonants are selected by using a switch, control lever, or joy stick to scroll forwards to the control input vowel associated with the desired consonant. Upon reaching the correct control input vowel, the user moves the switch, control lever, or joy stick through the middle to the back, "B" position. The desired consonant is selected by scrolling through the secondary input selections. The appropriate secondary input is selected by moving the switch, control lever, or joy stick to the central position. For instance for the word "vowel" the user moves the control lever to the vowel area and toggles through the vowels until the vowel "U" is reached (460). The user then moves the control lever back to the consonant area and the first letter displayed will be the first consonant following the "U" which is V (466), the user then moves the control lever to the middle or directly forward to the vowel area and toggles to the vowel "O" and back to the middle area and then forward to the vowel area for the vowel "U" and back to the consonants to toggle to the "W", then forward to the vowels to toggle to the "E" and back to the middle and then forward to the vowel I and then back to the consonants to toggle to the letter "L".

Similarly, numbers are inputted by pushing down on the control lever and moving the lever, as depicted in FIG. 4F and Table 4B.

In one embodiment, numbers are reached by pushing down on the control lever and then moving forwards between 0 and 9. In other words when the control lever is pushed down and moved forward, "F", numerals 0-9 can be scrolled on the display screen instead of vowels. In one embodiment, symbols are selected by depressing the switch, control lever, or joy stick, and moving it back, "B". The user can scroll through a selection of symbols in that fashion. In one embodiment, the user accesses a shift function by depressing the switch, control lever, or joy stick, and moving it to the left, to access commands, for example for capitalizing a letter. In another embodiment, pushing down and moving the control lever to the right can activate scrolling through words, numbers, punctuation, symbols or for accessing websites or email addresses, or other such letters, numbers, characters, symbols, punctuation marks, commands, and the like that appear on a keyboard or keypad.

Though the examples given in the above are for a 4 actuator position switch, control lever, or joy stick, or the like, with one shift position, it will be appreciated by those in the art that such devices come with a wide variety of actuator positions; from one to multiple actuator positions, as well as a variety of features, such as programmable LCD displays, or lighted displays, or the like.

Keypad Entry

A device used in accordance with methods and of the invention has a keypad, as shown in FIGS. 5A, 5B, 6, 7A, and 7B. Keypads are common input components for interactive devices such as personal digital assistants (PDAs), watches, mobile phones, pagers, e-mail devices, web appliances, web tablets, tablet PCs, game devices, and remote controls, etc. A user viewing area is used for displaying a short list of letters or numbers in an arranged order.

One embodiment of systems, methods, and devices for efficient communication using an interactive device with a keypad is shown in FIGS. 5A and 5B, and further described in Table 5A. In FIG. 5A, a standard 12 position, 3×4 keypad 500 is shown, with keys 501-512. Keys 502-506 of FIG. 5A are control inputs, each associated with a vowel from the list of vowels A, E, I, O and U, respectively, while key 501 of FIG. 5A is the secondary input for entry of such vowels. By entering a control input selected from keys 502-506 followed by a secondary input using key 501, a vowel is selected. This is demonstrated in Table 5A, where in first row a control input is identified with a vowel; i.e. "A" is identified with key 502, "E" is identified with key 503, "I" is 504, "O" is identified with key 505, and "U" is identified with key 506. As can be see in Table 5A, the selection of control inputs using key 502-506 followed by the secondary input using key 501 selects a vowel using this system and method.

Additionally, each control input representing a vowel is associated with a selection of secondary inputs. The control input for "A" is associated with the consonants immediately following, which are B, C, D. The control input for "E" is associated with the consonants F, G, H, the control input for "I" is associated with the consonants J, K, L, M, N, the control input for "O" is associated with P, Q, R, S, T, and the control input for "U" is associated with V, W, X, Y and Z. Keys 501-506 of FIG. 5A are used as secondary inputs for inputting a single character from which the entire alphabet can be inputted, as shown in Table 1A. After entering a specific control input, followed by entering a specific secondary input, the device enters and may store the selected entry representing a letter, number, character, mathematical symbol, punctuation mark, and the like. If desired, the selected entry may be displayed on a viewing area.

In reference to Table 5A, it is clear that the selection and entering of a control input, followed by the selection and entering of a secondary input is a unique signature for a letter, from which text entries can be readily built. As an example, "phone home" would be a string of inputs as: 505-502, 503-504, 505-501, 504-506, 503-501 (space) 503-504, 505-501, 504-505, 503-501.

With a 12 position keypad, numbers are inputted as shown in Tables 5B and 5C, which are exemplary embodiments of using the sequential entering of control inputs and secondary inputs for numeric entries. For the embodiment shown In Table 5B, the control input keys are 501 and 502, and are associated with the numerals "0" and "5", respectively, and the secondary input keys are 501-505. By entering a control input selected from keys 501-502 followed by entering a secondary input selected from keys 501-505, a number between 0 and 9 is selected. Another embodiment of a system for entering numbers is shown in Table 1C. In this embodiment, control inputs, as well as secondary inputs utilize keys 501-509, and key 511, and thereby a number between 0 and 99 may be selected.

Using either of the embodiments of Table 5B or 5C, numeric entries can be ready built. As an example, referring to Table 5B, the number "1948" can be entered as the following string of inputs:

Table 5B: 501-501, 502-505, 501-504, 502-504; or

Table 5C: 502-511; 505-509

It may be readily appreciated by a person skilled in the art that, since the control input numerals "0" and "S" and their respective associated numerals contain all of the digits to enter a desired number (0, 1, 2, 3, 4, 5, 6, 7, 8, and 9), the number of inputted numerals can range from one to whatever number is desirable. The same reasoning applies to the expanded list of entries shown in Table 5C.

From Tables 5A, 5B, and 5C, it is clear that alphanumeric input can be easily entered with a keypad input device using this system and method. Though letters and numbers are given herein as an example, it will be clear to one of ordinary skill in the art that additionally, sets of characters such as mathematical symbols, punctuation marks, and the like, and combination thereof, can also be created using this system and method.

Additionally, as previously discussed for the examples of embodiments of the sign language code, hand-mounted device, texting mouse, and switches, control levers and joy sticks, and the like, a variety of embodiments may be drawn from the different designations for assigning keys to control inputs and secondary inputs. For example, an alternative embodiment to FIGS. 5A and 5B might have the control inputs placed in a more vertical arrangement by having the control inputs A, E, I, O and U assigned to keys 501, 504, 507, 510, and 511, respectively, with the secondary input for the vowels, or the V2 key, designed by key 505 or 508. The secondary input functions may be assigned to keys 502, 503, 506, 509, and 512. In still another embodiment, the control inputs A, E, I, O and U assigned to keys 501-505, respectively, with the secondary input for the vowels, or the V2 key, designed by key double tapping the vowel control key. In this embodiment, "A" is 501-501, "E" is 502-502, "I" is 503-503, "O" is 504-504, and "U" is 505-505. The secondary control inputs may be assigned to keys 507-511. What is described above is meant to provide some examples of the various ways that the keys may be assigned to control inputs and secondary inputs. As will be appreciated by those of skill in the art, other assignments of keys to control inputs and secondary inputs can be made without departing from the scope of the disclosure this invention.

FIG. 5B shows an embodiment of a keypad with the control inputs prominently displayed on the keys. This embodiment of the keypad may be useful as an input device on interactive devices having display screens. By pressing a control input key, the selection of secondary inputs is then shown on a display screen.

As an example of such an embodiment where the interactive device has a display screen, in referring to FIG. 5B and Table 5A, for letter entries, when a user selects key 502, the display area would show:

501:A 502:B 503:B 504:D

Likewise, when a user selects key 503, the display area would show:

501:E 502::F 503:G 504:H

Similarly, when a user selects key 504, the display area would show:

501:I 502:J 503:K 504:L 505:M 506:N

When a user selects key 505, the display area would show:

501:O 502:P 503:Q 504:R 505:S 506:T

Finally, when a user selects key 506, the display area displays:

501:U 502:V 503:W 504:X 505:Y 506:Z

As another example of this embodiment, referring to FIG. 5A, Table 5C, for numeric entries, when a user selects key 501, the display area would show:

501:0 502::1 503:2 504:3 505:4 506:5 507:6 508:7 509:8 511:9

Likewise, when a user selects key 502, the display area would show:

501:10 502:11 503:12 504:13 505:14 506:15 507:16 508:17 509:18 511:19

Similarly, when a user selects key 503, the display area would show:

501:20 502:21 503:22 504:23 505:24 506:25 507:26 508:27 509:28 511:29

Finally, when a user selects key 511, the display area displays:

501:90 502:91 503:92 504:93 505:94 506:95 507:96 508:97 509:98 511:99

In this fashion, the display of the secondary input letters on the optional display screen in response to a user pressing a control input reinforces the associating of the secondary input letters each with their own control input letter. Additionally, it is contemplated that users may save their inputs to a storage medium. Further, some embodiments may be capable of communicating with other computing devices, software programs, and the Internet.

Another embodiment of the system and method disclosed herein utilizing a keypad as an input device is shown in FIG. 6, and further described in Tables 6A, 6B, and 6C. This exemplary keypad is a 15 position keypad, in a 3×5 array of keys. As can be seen from Tables 6A and 6B, the principles for the system and method of the disclosed invention for embodiments of the 12 position keypad described are applicable for the 15 position key pad. However, for this embodiment, the secondary input for entering the vowels is key 606, shown in FIG. 6, while all the other keys used for control inputs and secondary inputs are keys 601-605, residing in the first column. This provides the user added convenience of having the majority of all entries made from keys in a single row, and facilitates entry on the 15 position keypad using a single-hand.

A person of skill in the art would appreciate that the order and number of buttons in an array may vary without departing from the scope of what is disclosed about the method and system embodiments of inputting information into compact interactive devices. Alternative embodiments of the 15 position keypad 700 are shown in FIGS. 7A and 7B. Analogous to keypad 500 of FIG. 5B, the embodiments of keypads 700 represented by FIGS. 7A and 7B have the control inputs shown prominently on the keys. By pressing a specific control input key, the secondary inputs are actuated and may be displayed on a display screen.

Additionally, as previously discussed for the examples alternative embodiments to FIGS. 5A and 5B, a variety of embodiments may be drawn from the different designations for assigning keys to control inputs and secondary inputs. For example, in FIG. 7A, the control inputs A, E, I, O and U assigned to keys 701-705, respectively, with the secondary input for the vowels, or the V2 key, designed by key double tapping the vowel control key. In this embodiment, "A" is 701-701, "E" is 702-702, "I" is 703-703, "O" is 704-704, and "U" is 705-705. The secondary control inputs may be assigned to keys 706-710. For FIG. 7B, the control inputs would be designated by A" is 711-711, "E" is 712-712, "I" is 713-713, "O" is 714-714, and "U" is 715-715, while the secondary inputs may be assigned to keys 706-710.

Though examples have for a keypad with 15 keys in a 3×5 array has been given, in alternative embodiments the keys may be arranged in a 5×3 array. Finally, though keypads having 12 key and 15 keys have been given, the principles described herein apply to any keypad with any number of keys. What is described above is meant to provide some examples of the various ways that the keys may be assigned to control inputs and secondary inputs. As will be appreciated by those of skill in the art, other assignments of keys to control inputs and secondary inputs can be made without departing from the scope of the disclosure this invention.

While a display screen is not required for use with a keypad, as shown in FIGS. 5A, 5B, 6, 7A, and 7B, other embodiments of an interactive device with a keypad or keyboard have one or more display screens, or similar viewing areas, such as an LCD screen. Such display screens or similar viewing areas may be used for displaying a short list of characters or other symbols in an arranged order. In these embodiments, a user-selected letter, number, character, symbol, punctuation mark, or command may be displayed either on a separate portion of the display screen of the same device or on a separate display screen, or on both. Alternatively, input and output may be communicated to the user via sound, such a voice chip, or via mechanical means, such as vibration, as previously mentioned.

FIGS. 8A-8C are renderings of an intact interactive communication device having a reduced-size input component. FIG. 8A is a mobile communication device 800 having a reduced-size keypad 810, reduced-size keys 820, reduced-size function keys 830, a display area 840, a voice input or output device, or both, such as a microphone or a speaker 850, and an antenna 860. The keys 820 of keypad 810, of the device 800 are keys for standard uses, such as dialing, as well for entering control inputs and secondary inputs. The device has separate function keys 830.

FIG. 8B is an alternative embodiment of a mobile communication device 800 having a reduced-size keypad 810, reduced-size keys 820, reduced-size function keys 830, and separate reduced-size control input and secondary input keys 835 on the side of the mobile communication device for ready actuation by the thumb and fingers of one hand. In the embodiment of a mobile communication device shown in FIG. 8B, analogous to the example of pads on a texting mouse, there are two control input keys 835 on the right hand side which are actuated by the thumb, and four control input keys 835 on the left side that are actuated by a finger or fingers. As shown in FIG. 8B, the lower key 835 on the right hand side is the key for actuating the secondary input selection for the vowels, for example, when the entries are letters. Like the embodiment of FIG. 8A, this embodiment has a display area 840, a voice input or output device, or both, such as a microphone or a speaker 850, and an antenna 860.

Though FIG. 8B is shown with four control input and secondary input keys 835 on the left side of the interactive mobile device, and two control input and secondary input keys 835 on the right side, it is understood by those of skill in the art, that a variety of arrangements of the keys can be implemented. For example, the mobile communication device 800 of FIG. 8C, when held in the right hand, has the control input and secondary input keys 835 arranged for easy actuation of the keys using the fingers on the left side of the device. The sixth secondary input key 835 for entering vowels, for example when text is being inputted, is arranged for easy actuation using the thumb on the right side of the device. In an alternative embodiment, the control input and secondary input keys 835 could be placed in an opposite arrangement for ease of use with the left hand. In still other embodiments, the control input and secondary input keys 835 may be located all on one side.

The display area 840 of the device 800 of FIGS. 8A-8C may display the letters, numbers, characters, symbols, punctuation marks, commands, and the like that the user has selected. In other embodiments, rather than being part of the same keypad 810, the display area 840 can be viewed on a physically separate display (not shown), thereby allowing the user full use of the keypad 810 and the function keys 830. Such a physically separate display can be incorporated in the same device, or it can be incorporated into another device that communicates with a device such as 800.

For interactive devices, such as the exemplary mobile communication device 800 of FIGS. 8A-8C, when a user enters information using keypad 810, a processor receives the inputted signal, and either displays additional information (such as a set of secondary inputs) on the display area 840 or stores the information inputted by the user on a storage medium (not shown).

Using the keypad 810, control inputs and secondary inputs may be entered. The function keys 830 may actuate a range of functions such as a space bar input, a backspace input, a shift input, and a menu bar input, as well as functions for controlling the display, such as a scroll input. The keypad 810, may have a plurality of input and function keys, such as in FIGS. 5A, 5B, 6, 7A and 7B, which are exemplary of the various ways a keypad may be designed. Using a keypad such as 810, control inputs and secondary inputs for any selection of letters, numbers, characters, mathematical symbols, punctuation marks, or the like, may be made as shown in the tables associated with FIGS. 1-7, and previously discussed.

In one embodiment of the inventive systems, methods, and devices disclosed herein for use with interactive devices, such as the mobile communication device 800 of FIGS. 8A-8C, upon selection by a user of one of the desired control inputs, a processor receives the input signal, and in response displays the associated list of secondary inputs in display area 840. These secondary inputs may be displayed clearly identified with the key that actuates that entry, as previously described, or in devices with a touch screen, may be selected by touching the desired secondary input selection. In some embodiments, the control inputs selections remain displayed on the display screen 840, while the secondary inputs are displayed, while in other embodiments, the control inputs and secondary inputs may be displayed sequentially. In embodiments where the control inputs and secondary inputs are displayed simultaneously, the non-selected control inputs may be displayed with reduced shading or differing color to show that they have not been selected. In still other embodiments, the non-selected control inputs may remain active, thereby allowing the user to change the set of secondary inputs simultaneously displayed.

Upon user selection of an entry by entering a control input followed by a secondary inputs, a signal is sent to a processor, which in turn stores the user-selected character or other symbol on a storage medium and if desired sends a signal to the display area 840 to display the selected letter, number, character, mathematical symbol, punctuation mark, or the like. In some embodiments, if the user does not select a secondary input within a predetermined time, the secondary inputs are removed from the display area 840, and the original set of control inputs are displayed.

Control function keys 830 may be actuated for further processing of inputted information. Once the user has selected and entered a secondary input, the processor then removes the secondary inputs from the display area 840, and returns the display of control inputs. There is a delay set between the entering of the desired secondary input selected and the removal of the secondary inputs form the display area 840. During this delay, function keys 830, such as a shift input, a punctuation input, or a space input, may be actuated to further process the entry for capitalization, punctuation, or for adding a space. In addition, for the keypad embodiment, the user may desire to have the character that is being input capitalized. In some embodiments, the user may capitalize a character by simultaneously touching the selected control input and the selected secondary input. Function keys that may be included in the for text editing and inputting include scrolling input, a select input, a tab input, a space bar input, a backspace input, and an enter input.

In addition to its usually function for capitalization of letters, in some embodiments, a shift key may also be used to alternate between sets of letters, numbers, characters, mathematical symbols, punctuation marks, or the like. In still other embodiments, the user may activate the numeric function of the keypad device by pressing the pound sign (#) key, which is standard on many keyboards. In other embodiments, a menu function key may be available for expanding the selection list of control inputs, secondary inputs, functions, and options that may be accessed on an interactive device, such as the mobile communication device 800 of FIGS. 8A-8C. The display area 840 of interactive devices such as the mobile communication device 800 may display a menu, showing the control inputs, secondary inputs, functions, and options that are currently available to a user. Additionally, the user may activate different menus, giving access to an even expanded set of control inputs, secondary inputs, functions, and options.

A scrolling function may be used in some embodiments, where functions keys 830 are scroll or arrow keys to facilitate choosing control inputs, secondary inputs, functions, and options from the display are 840. In such embodiments, pressing a forward arrow input or aback arrow input sends a signal to the processor, which in response moves the set control inputs, secondary inputs, functions, and options to the left or right respectively, thereby allowing the user rapid access to what is displayed.

Keypad 810 with keys 820, function keys 830, and control and secondary input keys 835 of interactive mobile device 800 of FIGS. 8A-8C have been used as an exemplary reduced-size input components to illustrate embodiments of inventive the systems and method. In FIGS. 9A-9C, a PDA watch 900 is depicted as another example of an interactive device with reduced-size input components.

In FIG. 9A, an embodiment of a PDA watch 900 is shown, having input buttons 910, and function button 920, as well a voice input or output device 930, such as a microphone or speaker, respectively, or both, and a display screen 940. In this embodiment, the input buttons, 910, may be used to actuate control and secondary input selections, and function button 920 may be used for the secondary input for the vowels. FIGS. 9B and 9C are alternative embodiments of a PDA watch, having separate control input and secondary input keys 910 on the rim of the watch, in an horizontal arrangement (FIG. 9B), and alternatively, in a vertical arrangement (FIG. 9C).

As previously mentioned, for interactive devices, such as shown in FIGS. 8A-8C, and FIGS. 9A-9C, inputs and outputs may be displayed on a display device, such as a display screen 840, 940. Such devices may have one or more display screens. As previously mentioned, the display screens are useful for two purposes. First, they may be used for viewing control inputs or secondary inputs of letters, numbers, characters, symbols, punctuation marks, commands, and the like for selection by the user. Second, they may display the text, symbols, or commands, etc. that have been inputted for further processing, such as editing, before the entering, sending, or storing the input. The interactive devices such as the mobile communication device 800, or the PDA watch 900, microphones and speakers, such as 850 of device 800, or 930 of device 900, so that input and output are communicated to the user via sound. In still other embodiments of interactive devices such as 800, 900, the devices may have mechanical means, such as vibration, for communicating to the user. In this regard, though the systems, methods, and devices of the disclosed invention may be used by a variety of end-users, they are suited for assistive technologies.

The foregoing description of embodiments of the present disclosure has been provided for the purposes of illustration and description. It is not intended to be exhaustive or to limit the disclosure to the precise forms disclosed. Many modifications and variations will be apparent to the practitioner skilled in the art. The embodiments were chosen and described in order to best explain the principles of this disclosure and its practical application, thereby enabling others skilled in the art to understand various embodiments and with various modifications that are suited to the particular use contemplated. It is intended that the scope of this disclosure be defined by the following claims and its equivalence.

What is claimed is:

1. An input device for entering data, said input device comprising:
   a housing; and
   an input control coupled to the housing to input data, wherein a first movement of the input control toggles through a first set of data inputs, wherein each individual data input of the first set of data inputs is associated with a set of secondary data inputs greater in number than the individual data input associated therewith, and wherein said first set of data inputs and each set of secondary data inputs is a subset of a larger set of data, and wherein the first movement of the input control selects an individual data input as a control input, and wherein a next movement of the input control performs one of:
      selects the control input as a secondary input, if the next movement is to a middle position on the housing for entry of data; and
      toggles through a set of secondary data inputs corresponding to the control input, wherein the next movement of the input control selects an individual data input from the set of secondary data inputs corresponding to the control input as a secondary input; and
   wherein the control input provided by the first movement followed by the secondary input provided by the next movement produces a unique data input for the entry of data.

2. The input device of claim 1, wherein the first set of data input comprises vowels of an alphabet and the set of secondary data inputs corresponding to the control input comprises consonants of the alphabet.

3. The input device of claim 2, wherein the next movement of the input control comprises moving the input control to the middle position to provide a secondary input that comprises an entering of the selected vowel.

4. The input device of claim 1, wherein the first movement comprises moving the input control in one direction and the next movement comprises moving the input control in another direction.

5. The input device of claim 4, wherein movement of the input control in one or more other directions provides one or more other inputs.

6. The input device of claim 4, wherein depression of the input control associated with movement of the input control provides one or more additional inputs.

7. The input device of claim 1, wherein the input control comprises a reduced-size control.

8. The input device of claim 1, wherein the input control comprises one of a lever, a switch and a joy stick.

9. The input device of claim 1, wherein the housing comprises a display for displaying one or more of the unique data input, the control input, the secondary input, and the set of secondary data inputs.

10. The input device of claim 1, wherein the housing comprises a communications medium for communicating to the user at least one of input and output of the input device.

11. The input device of claim 10, wherein the communications medium comprises at least one of a display, a voice chip and a mechanical component.

12. The input device of claim 1, wherein the input control is controllable by a plurality of digits of one or more hands of a user.

13. The input device of claim 1, wherein the first set of data input comprises a first group of numbers and the set of secondary data inputs corresponding to the control input comprises a second group of numbers.

14. The input device of claim 1, wherein the secondary input selected from the set of secondary data inputs is selected by moving the input control past the middle position to the desired individual data input in the set of secondary inputs corresponding to the control input and then returning the input control to the middle position.

15. The input device of claim 1, wherein a control input of a vowel A has associated therewith a set of secondary data inputs comprising consonants B, C and D, a control input of a vowel E has associated therewith a set of secondary data inputs comprising consonants F, G and H, a control input of a vowel I has associated therewith a set of secondary data inputs comprising consonants J, K, L, M and N, a control input of a vowel O has associated therewith a set of secondary data inputs comprising consonants P, Q, R, S and T, and a control input of a vowel U has associated therewith a set of secondary data inputs comprising consonants V, W, X, Y and Z.

16. A method of entering data, said method comprising:

first moving an input control to toggle through a first set of data inputs, wherein each individual data input of the first set of data inputs is associated with a set of secondary data inputs greater in number than the individual data input associated therewith, and wherein said first set of data inputs and each set of secondary data inputs is a subset of a larger set of data, and wherein the first movement of the input control selects an individual data input as a control input; and next moving the input control to perform one of:

select the control input as a secondary input, if the next movement is to a middle position on the housing for entry of data; and toggle through a set of secondary data inputs corresponding to the control input, wherein the next movement of the input control selects an individual data input from the set of secondary data inputs corresponding to the control input as a secondary input; and wherein the control input provided by the first movement followed by the secondary input provided by the next movement produces a unique data input for the entry of data.

17. The method of claim 16, wherein the input control is moved using a single digit of a user's hand.

18. The method of claim 16, wherein the first set of data input comprises vowels of an alphabet and the set of secondary data inputs corresponding to the control input comprises consonants of the alphabet.

19. The method of claim 16, wherein the first set of data input comprises a first group of numbers and the set of secondary data inputs corresponding to the control input comprises a second group of numbers.

* * * * *